(12) United States Patent
Janjua et al.

(10) Patent No.: US 10,808,193 B2
(45) Date of Patent: Oct. 20, 2020

(54) COBALT HYDROXYSTANNATE NANOCUBE FUEL ADDITIVE

(71) Applicant: KING FAHD UNIVERSITY OF PETROLEUM AND MINERALS, Dhahran (SA)

(72) Inventors: Muhammad Ramzan Saeed Ashraf Janjua, Dhahran (SA); Saba Jamil, Faisalabad (PK); Hasnaat Ahmad, Faisalabad (PK); Shanza Rauf Khan, Faisalabad (PK)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 16/452,717

(22) Filed: Jun. 26, 2019

(65) Prior Publication Data
US 2020/0283690 A1 Sep. 10, 2020

Related U.S. Application Data

(60) Provisional application No. 62/815,737, filed on Mar. 8, 2019.

(51) Int. Cl.
*C10L 1/12* (2006.01)
*C01G 51/04* (2006.01)

(52) U.S. Cl.
CPC ............ *C10L 1/1233* (2013.01); *C01G 51/04* (2013.01); *C10L 2200/024* (2013.01); *C10L 2200/029* (2013.01); *C10L 2230/22* (2013.01); *C10L 2270/02* (2013.01)

(58) Field of Classification Search
CPC ............. C10L 1/1233; C10L 2200/024; C10L 2200/029; C10L 2230/22; C10L 2270/02; C01G 51/04
See application file for complete search history.

(56) References Cited

FOREIGN PATENT DOCUMENTS

| CN | 103395828 A | 11/2013 |
| CN | 104310452 A | 1/2015 |
| CN | 106082312 B | 10/2017 |
| CN | 107224978 A | 10/2017 |

OTHER PUBLICATIONS

Hu, Weidong et al., "High efficient flame retardancy and smoke suppression effect of cobalt hydroxystannate on flexible polyvinyl chloride" (Abstract), Journal of Acta Materiea Compositae Sinica, vol. 36, Issue 9, Sep. 15, pp. 2067-2075 <http://fhclxb.buaa.edu.cn/EN/abstract/abstract14561.shtml> (Year: 2019).*

(Continued)

*Primary Examiner* — Jacob M Amick
(74) *Attorney, Agent, or Firm* — Oblon, McClelland, Maier & Neustadt, L.L.P.

(57) ABSTRACT

A method for enhancing the efficiency of a liquid fuel is described. The method involves the addition of cobalt hydroxystannate nanoparticles to the liquid fuel to produce an enhanced liquid fuel. The cobalt hydroxystannate nanoparticles may be present at a concentration of 50-200 ppm, and may increase the calorific value of the fuel by a factor of 25-52 times.

20 Claims, 25 Drawing Sheets

(56) References Cited

OTHER PUBLICATIONS

Saba Jamil, et al., "The first morphologically controlled synthesis of a nanocomposite of graphene oxide with cobalt tin oxide nanoparticles", RSC Advances, vol. 8, Issue 64, 2018, pp. 36647-36561.

Danwei Huang, et al., "Hydrothermal synthesis of $MSn(OH)_6$ (M=Co, Cu, Fe, Mg, Mn, Zn) and their photocatalytic activity for the destruction of gaseous benzene", Chemical Engineering Journal, vol. 269, Jun. 1, 2015, pp. 168-179 (Abstract only).

Saba Jamil, et al., "First Synthetic Study of Cube-Like Cobalt Hydroxystannate Nanoparticies as Photocatalyst for Drimarene Red K-4BL Degradation and Fuel Additive", Journal of Cluster Science, vol. 29, Issue 4, May 9, 2018, pp. 685-696.

\* cited by examiner

COBALT HYDROXYSTANNATE NANOCUBE FUEL ADDITIVE

CROSS REFERENCE TO RELATED APPLICATIONS

This application claims the benefit of priority from U.S. Provisional Application No. 62/815,737 filed Mar. 8, 2019, which is incorporated herein by reference in its entirety.

STATEMENT REGARDING PRIOR DISCLOSURES BY THE INVENTORS

Aspects of this technology are described in an article "First Synthetic Study of Cube-Like Cobalt Hydroxystannate Nanoparticles as Photocatalyst for Drimarene Red K-4BL Degradation and Fuel Additive" by Saba Jamil, Hasnaat Ahmad, Shanza Rauf Khan, and Muhammad Ramzan Saeed Ashraf Janjua, in *Journal of Cluster Science* (2018) 29: 685, DOI 10.1007/s10876-018-1387-1, which is incorporated herein by reference in its entirety.

STATEMENT OF ACKNOWLEDGEMENT

This project was prepared with financial support from the Deanship of Scientific Research (DSR) at King Fahd University of Petroleum and Minerals (KFUPM) through Project No. SR161009.

BACKGROUND OF THE INVENTION

Technical Field

The present invention relates to a method of enhancing the efficiency of a liquid fuel using cobalt hydroxystannate nanoparticles.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Nanotechnology is a branch of science which deals with the particles at nanoscale. It has attained the attention of a large audience of researchers because of its applications in various fields of science for the production of new materials that are in the nano range. These nanomaterials show attractive and size-subordinate synthetic, electrical, and natural attributes that cannot be achieved by their bulk parts. In modern research, in the fields of physics, chemistry, and biology, and in material sciences, the controlled morphological synthesis of nanomaterial has attracted the attention of scientists due to their large surface area, crystal size, crystal orientation and structure of synthesized nanoparticles. See B. Wu, C. Guo, N. Zheng, Z. Xie, and G. D. Stucky (2008). *J. Am. Chem. Soc.* 130, 17563; D. Deng and J. Y. Lee (2008). *Chem. Mater.* 20, 1841; and X. Han, Q. Kuang, M. Jin, Z. Xie, and L. Zheng (2009). *J. Am. Chem. Soc.* 131, 3152, each incorporated herein by reference in their entirety.

Many researchers have tried to achieve good morphology of the products using different methods and materials during the experiment such as for the synthesis of iron copper bimetallic nanoparticles sodium borohydride being used as an additive material and carbonaceous nano fiber being use for the synthesis of functional inorganic nanotubes, surfactant, and ionic liquid. See J. Wang, C. Liu, L. Tong, J. Li, R. Luo, J. Qi, Y. Li, and L. Wang (2015). *RSC Adv.* 5, 69593; J.-Y. Gong, S.-R. Guo, H.-S. Qian, W.-H. Xu, and S.-H. Yu (2009). *J. Mater. Chem.* 19, 1037; T. He, D. Chen, X. Jiao, and Y. Wang (2006). *Adv. Mater.* 18, 1078; and L. Ge, X Y. Jing, J. Wang, S. Jamil, Q. Liu, D. L. Song, J. Wang, Y. Xie, P. P. Yang, and M. L. Zhang (2010). *Crys. Grow. Des.* 10, 1688, each incorporated herein by reference in their entirety. Simple metal oxides nanoparticles are widely applicable in electronics, medicine, biomedical, storage devices, catalysis, gas sensing, drug delivery, and cosmetics. See A. Babar. S. Shinde, A. Moholkar, and K. Rajpure (2010). *J. Alloys Comp.* 505, 743; A. Chen and S. Chatterjee (2013). *Chem. Soc. Rev.* 42, 5425; S. S. Srinivasan, M. U. Niemann, D. Y. Goswami and E. K. Stefanakos 2012, Google Patents; S. Jamil, M. R. S. A. Janjua. S. R. Khan. and N. Jahan (2017). *Mater. Res. Exp.* 4, 015902; S. Jamil, X. Jing, J. Wang, J. Liu, and M. Zhang (2013). *Mater. Res. Bull.* 48, 4513; S. Laurent. S. Dutz, U. O. Ha'feli, and M. Mahmoudi (2011). *Adv. Colloid Interf Sci.* 166, 8; and S. Kokura, O. Handa, T. Takagi, T. Ishikawa, Y. Naito, and T. Yoshikawa (2010). *Nanomed. Nanotechnol. Biol. Med.* 6, 570, each incorporated herein by reference in their entirety. These nanoparticles have significant impact due to their unique chemical and physical properties such as their edges and limited size. See H. L. Liu, M. Y. Hua, H. W. Yang, C. Y. Huang, P. C. Chu, J. S. Wu, I. C. Tseng, J. J. Wang, T. C. Yen, and P. Y. Chen (2010). *Proc. Nat. Acad. Sci.* 107, 15205, incorporated herein by reference in its entirety.

The properties of metal oxide nanoparticles depend on stacking number, aspect ratio, and crystalline density. See S. Farhadi, K. Pourzare, and S. Sadeghinejad (2013). *J. Nanostruc. Chem.* 3, 16, incorporated herein by reference in its entirety. The size, structure (micro structure), and morphology of the nanoparticles has great impact on the material properties, so controlled morphology can be obtained by applying different strategies and proper handling of the experiment. See S. Jamil, M. R. S. A. Janjua, and T. Ahmad (2014). *Solid State Sci.* 36, 73, incorporated herein by reference in its entirety. Nowadays the trend of synthesis of bi-metallic nanoparticles, bi-metallic alloys, and bi-metallic oxide has increased direct detection of $H_2O_2$, as well as investigation of hydrogen storage capacity in bi-metallic alloys, dramatically due to their use in removing traces of Cr(VI) from natural alkaline solutions, mercury ion detection, reduction of organic dye from waste water, and in lithium ion battery anode due to their high natural abundance and high theoretical capacity. See N. Qin, Y. Zhang, H. Zhou, Z. Geng, G. Liu, Y. Zhang, H. Zhao, and G. Wang (2016). *J. Colloid. Interf. Sci.* 472, 8; H. Shao, J. Matsuda, H.-W. Li, E. Akiba, A. Jain, T. Ichikawa. and Y. Kojima (2013). *Intl. J. Hydrogen Ener.* 38, 7070; A. Palmieri. R. Kashfi-Sadabad. S. Yazdani. M. Pettes, and W. E. Mustain (2016). *Electrochim. Acta* 213, 620; W. Liu, K. Hiekel, R. Hibner. H. Sun, A. Ferancova. and M. Sillanpa (2018). *Sens. Actua. B* 255, 1325; S. Li, T. Wei, M. Tang, F. Chai, F. Qu, and C. Wang (2018). *Sens. Actua. B* 255, 1471; and M. Ismail, M. Khan, S. B. Khan, M. A. Khan, K. Akhtar, and A. M. Asiri (2018). *J. Mol. Liq.* 459, 320, each incorporated herein by reference in their entirety. The study investigated that in bimetallic or trimetallic nanoparticles the collaborations of different metals at suitable environment forms core-shells, alloys, or many other heterometallic complex nanostructures that enhance the structural and electronic properties of the nanoparticles. See P. Destro, T. M. Kokumai, A. Scarpellini, L. Pasquale, L. Manna, M. Colombo, and D. Zanchet (2018). *ACS Catalysis* 8, 1031, each incorporated herein by reference in its entirety. Bimetallic nanoparticles are superior to mono metallic nanoparticles due to synergistic effects and cost effectiveness. See N. Arora, A. Mehta, A. Mishra, and S. Basu (2018). *Appl. Clay Sci.* 151, 1; and Z. Guo, T. Liu, Q. Wang, and G. Gao (2018). *RSC Adv.* 8, 843, each incorporated herein by reference in their entirety.

Recently, yttrium iron oxide ($YFeO_3$) nanoparticles have been prepared by mechanochemical method from salts of yttrium and iron chloride through a basic media and electric discharge method was used to synthesize bismuth and antimony nanopowders in liquid impulse plasma. See A. Vázquez-Olmos, M. Sanchez-Vergara, A. Femrnndez-Osorio, A. Hemández-García, R. Sato-Berrú, and J. Alvarez-Bada (2018). *J. Cluster Sci.* 29, 225; and A. Matkasymova, E. Omurzak, and S. Sulaimankulova (2009). *J. Cluster Sci.* 20, 153, each incorporated herein by reference in their entirety. Many researchers try to use different metal hydroxystannates as Hill et al. used $CaSn(OH)_6$ as a replacement composite by using two forms of $SnCl_2$ and $SnCl_4$ and it was also used for the photocatalytic degradation of benzene under ultra violet irradiation. See J. Hill and J. H. Sharp (2005). *J. Am. Ceram. Soc.* 88, 560; and S. Meng, D. Li. M. Sun, W. Li, J. Wang, J. Chen, X. Fu, and G. Xiao (2011). *Catal. Commun.* 12, 972, each incorporated herein by reference in their entirety. Barchiche et al. use $MgSn(OH)_6$ to study the protective coating resistance corrosion behavior of Sn containing layer on AZ91D magnesium alloy composed by plasma electrolytic oxidation. See C.-E. Barchiche, E. Rocca, and J. Hazan (2008). *Surf. Coat. Technol.* 202, 4145, incorporated herein by reference in its entirety. Furthermore, Neilson described that $MnSn(OH)_6$ and $CoSn(OH)_6$ have paramagnetic behavior. See J. R. Neilson, J. A. Kurzman, R. Seshadri, and D. E. Morse (2011). *Inorg. Chem.* 50, 3003, each incorporated herein by reference in its entirety.

Different methods were used to synthesize the $CoSn(OH)_6$ nanoparticles, for example, by fast sonochemical method, by photocatalytic reduction of $CO_2$ by co-precipitation method, and solvo thermal method. See P. Cheng, Y. Ni, K. Yuan, and J. Hong (2013). *Mater. Lett.* 90, 19; X. Lin, Y. Gao, M. Jiang, Y. Zhang, Y. Hou, W. Dai, S. Wang, and Z. Ding (2018). *Appl. Catal. B* 224, 1009; and G. Sun, S. Zhang, Y. Li, T. Jia, H. Chen, J. Cao, H. Bala, X. Wang, Y. Wang, and Z. Zhang (2015). *Mater. Lett.* 150, 105, each incorporated herein by reference in their entirety. A nonporous oxygen evolution catalyst was synthesized by selective electrochemical etching of $CoSn(OH)$, nanoparticles and used in oxygen evolution reaction (OER) due to its high compact properties and high surface area. See F. Song, K. Schenk, and X. Hu (2016). *Energy & Environ. Sci.* 9, 473, incorporated herein by reference in its entirety. In addition, fast rate of degradation of an organic dye can be attained by as-synthesized $CoSn(OH)_6$ nanoparticles with small size and small diameter that enlarge the surface area which helps to increase the efficiency of electron-hole separation by which the rate of the photocatalytic reaction can be increased. Wang et al. used the $CoSn(OH)_6$ hollow structure nano boxes for the photocatalytic degradation of methylene blue. See Z. Wang, Z. Wang, H. Wu, and X. W. D. Lou (2013). *Sci. Reports* 3, 1391, incorporated herein by reference in its entirety.

Li and al synthesized $CoSn(OH)_6$ nanoparticles by coprecipitation method using stannic chloride and cobalt chloride in the presence of sodium citrate, with ethanol used as solvent. See B. Li, G.-X. Zhang, K.-S. Huang. L.-F. Qiao, and H. Pang (2017). *Rare Metals* 36, 457, incorporated herein by reference in its entirety.

In view of the forgoing, one objective of the present invention is to synthesize cubic shaped $CoSn(OH)_6$ nanoparticles via a hydrothermal route in which stannic chloride and cobalt chloride were used as a precursor salts. The product was characterized by transmission electron microscope (TEM), scanning electron microscope (SEM), and X-ray diffraction (XRD) techniques. The synthesized cubic shape $CoSn(OH)_6$ nanoparticles may be used as a fuel additive.

BRIEF SUMMARY OF THE INVENTION

According to a first aspect, the present disclosure relates to a method of enhancing the efficiency of a liquid fuel. The method comprises adding cobalt hydroxystannate nanoparticles to the liquid fuel to produce an enhanced liquid fuel.

In one embodiment, the cobalt hydroxystannate nanoparticles consist essentially of cobalt hydroxystannate having the formula $CoSn(OH)_6$.

In one embodiment, the cobalt hydroxystannate is in the form of nanocubes having an average edge length in a range of 40-400 nm.

In one embodiment, the cobalt hydroxystannate is in a cubic crystal form having a unit cell dimension in a range of 7.0 to 8.5 Å.

In one embodiment, the cobalt hydroxystannate is in the space group P n-3 m.

In one embodiment, the cobalt hydroxystannate nanoparticles are present in the enhanced liquid fuel with a concentration in a range of 50-200 ppm.

In one embodiment, a calorific value of the enhanced liquid fuel is between 25 and 52 times the calorific value of the liquid fuel.

In one embodiment, the liquid fuel and the enhanced liquid fuel have specific gravities having a percent difference of 0.5% or less.

In one embodiment, a kinematic viscosity of the enhanced liquid fuel is 50-85% greater than a kinematic viscosity of the liquid fuel.

In one embodiment, the liquid fuel is at least one selected from the group consisting of kerosene fuel, diesel fuel, gasoline fuel, biodiesel fuel, alcohol fuel, and synthetic fuel.

In one embodiment, the liquid fuel is a diesel fuel.

In a further embodiment, the enhanced liquid fuel has a flash point of 35° C. or lower.

In a further embodiment, the enhanced liquid fuel has a fire point of 43° C. or lower.

In a further embodiment, the enhanced liquid fuel has a cloud point of 7° C. or lower.

In a further embodiment, the enhanced liquid fuel has a pour point of −10° C. or lower.

In a further embodiment, the enhanced liquid fuel has a calorific value in a range of 20-50 kJ/g.

In a further embodiment, the enhanced liquid fuel has a kinematic viscosity in a range of 5.75-7.00 $mm^{-2} \cdot s^{-1}$.

In a further embodiment, the enhanced liquid fuel has a cetane number of 50 or greater.

In a further embodiment, the enhanced liquid fuel has a specific gravity in a range of 0.7900-0.7950 $g/cm^3$.

In one embodiment, the cobalt hydroxystannate nanoparticles are part of a composition.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 2A-2B show a view of unit cell in different orientations; FIG. 2C shows the indication of numbers of cobalt, tin, oxygen and hydrogen atoms to locate their positions; FIG. 2D shows the dot surface of cobalt, tin, oxygen and hydrogen atoms; FIG. 2E shows the position of Cobalt, tin, oxygen, and hydrogen atoms in tetragonal lattice; FIG. 2F shows the octahedra present in one cubic unit cell; and FIG. 2G shows single octahedron with tin as central atom.

DETAILED DESCRIPTION OF THE EMBODIMENTS

Figure 1:
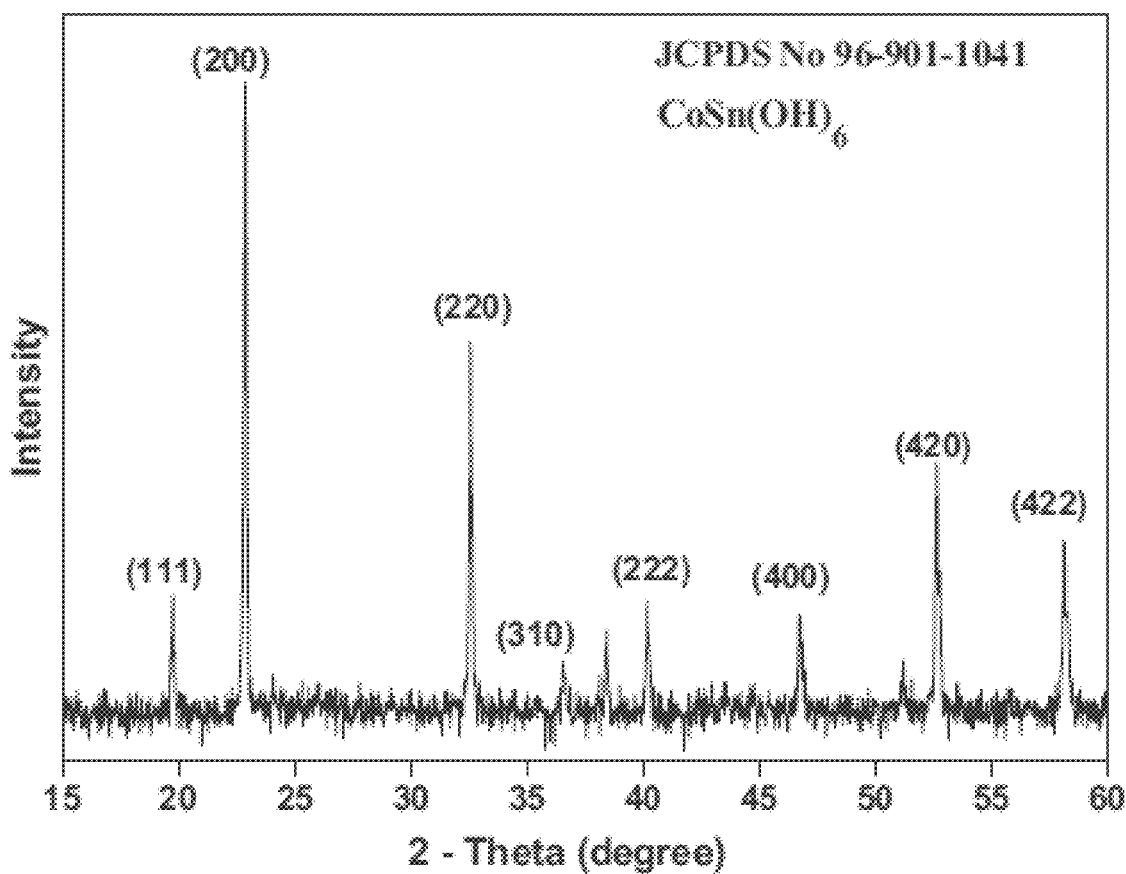
FIG. 1 is an XRD pattern of the synthesized $CoSn(OH)_6$.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $CoCl_2$ includes anhydrous $CoCl_2$, $CoCl_2.6H_2O$, and any other hydrated forms or mixtures. $SnCl_4$ includes both anhydrous $SnCl_4$ and $SnCl_4.5H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of tin include, $^{112}Sn$, $^{114}Sn$, $^{115}Sn$, $^{116}Sn$, $^{117}Sn$, $^{118}Sn$, $^{119}Sn$, $^{120}Sn$, $^{122}Sn$, $^{124}Sn$, and $^{112}Sn$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method of enhancing the efficiency of a liquid fuel. The method comprises mixing cobalt hydroxystannate nanoparticles with the liquid fuel to produce an enhanced liquid fuel. The cobalt hydroxystannate nanoparticles may be considered a nanocatalyst.

In one embodiment, the cobalt hydroxystannate nanoparticles consist essentially of cobalt hydroxystannate having the formula $CoSn(OH)_6$. Here, the cobalt hydroxystannate nanoparticles comprise at least 95 wt %, preferably at least 99 wt %, more preferably at least 99.5 wt/o CoSn(OH)$_6$ relative to a total weight of the cobalt hydroxystannate nanoparticles. In one embodiment, the cobalt hydroxystannate has a density in a range of 3.5-4.5 g/cm$^3$, preferably 3.6-4.4 g/cm$^3$, more preferably 3.7-4.3 g/cm$^3$, even more preferably 3.8-4.0 g/cm$^3$.

In one embodiment, the cobalt hydroxystannate is in a cubic crystal form having a unit cell dimension in a range of 7.0 to 8.5 Å, preferably 7.2 to 8.3 Å, more preferably 7.3 to 8.0 Å, or about 7.78 Å. In one embodiment, the cobalt hydroxystannate is in the space group P n-3 m.

In one embodiment, the cobalt hydroxystannate nanoparticles may have a spherical shape, or may be shaped like cubes, cylinders, boxes, spikes, flakes, plates, ellipsoids, toroids, stars, ribbons, discs, rods, granules, prisms, cones, flakes, platelets, sheets, or some other shape. Preferably the cobalt hydroxystannate nanoparticles are in the form of nanocubes.

In one embodiment, the cobalt hydroxystannate is in the form of nanocubes having an average edge length in a range of 40-400 nm, preferably 50-350 nm, more preferably 60-300 nm, even more preferably 70-250 nm, or 70-200 nm. In some embodiments, the average edge length may be in a range of 100-500 nm, 150-450 nm, 175-425 nm, or 200-400 nm. In one embodiment, each nanocube may have adjacent edges that form substantially perpendicular angles, where the substantially perpendicular angles formed in each nanocube deviate by less than 20°, preferably less than 15°, more preferably less than 10°, even more preferably less than 5° from an exact perpendicular angle of 90°. In one embodiment, the nanocubes may have rectangular or square faces, each having an aspect ratio in a range of 1.2:1-1:1, preferably 1.1:1-1:1, even more preferably 1.05:1-1:1, or about 1:1.

In one embodiment, the cobalt hydroxystannate nanoparticles are monodisperse in particle length (or edge length), having a coefficient of variation or relative standard deviation, expressed as a percentage and defined as the ratio of the particle length standard deviation ($\sigma$) to the particle length mean ($\mu$), multiplied by 100%, of less than 25%, preferably less than 10%, preferably less than 8%, preferably less than 6%, preferably less than 5%. In a preferred embodiment, the cobalt hydroxystannate nanoparticles are monodisperse having a particle length distribution ranging from 80% of the average particle length to 120% of the average particle length, preferably 85-115%, preferably 90-110% of the average particle length. In another embodiment, the cobalt hydroxystannate nanoparticles are not monodisperse.

In one embodiment, the cobalt hydroxystannate nanoparticles may be added as part of a composition having other ingredients. The cobalt hydroxystannate nanoparticles may be present in the composition at a weight percentage in a range of 0.1-99 wt %, 10-90 wt %, 20-80 wt %, 1-10 wt %, 10-20 wt %, 20-30 wt %, 30-40 wt %, 40-50 wt %, 50-60 wt %, 60-70 wt %, 70-80 wt %, or 90-98 wt %, relative to a total weight of the composition. The composition may be a liquid or solid, and the composition may be in the form of pills, pellets, beads, capsules, cartridges, tablets, rods, or powders, and may optionally be further coated, encapsulated, or doped as desired.

The composition may comprise other compounds including but not limited to a fuel-soluble wax, an ethylene vinyl acetate, and amine detergent (such as a polyamine, an aliphatic hydrocarbon-substituted amine, a polyalkylamine, a polyetheramine, a polyalkyl succinamide, a polyalkyl aminophenol, a product produced by reacting an acid with the reaction product of a vegetable oil and a polyamine, or a combination comprising one or more of the foregoing amine detergents), a polyolefin polymer, a carrier fluid, an agent for reducing soot, a tetra-alkyl lead compound, methylcyclopentadienyl manganese, a lead scavenger, a dyes, an antioxidant, a corrosion inhibitor, a bacteriostatic agent, an auxiliary dispersant or detergent, a gum inhibitor, a metal deactivator, an emulsifier, a demulsifier, an anti-valve seat recession additive, an anti-icing agent, a lubricating agent, a flow improver, an anti-wear additive, a pour point depressant, a cetane improver, a cloud point depressant; a wax anti-settling additive; a wax crystal modifier; a cold flow improver; a water removal agent (such as, for example, succinic anhydride, phthalic anhydride, benzoic anhydride, acetic anhydride, maleic anhydride, propionic anhydride, naphthalic anhydride, glutaric anhydride, and/or itaconic anhydride), or a combination of one or more of the foregoing additives.

As mentioned above, the composition may comprise a carrier fluid. Suitable carrier fluids include, for example, hydrocarbon-based materials such as polyisobutylenes (PIB's), polypropylenes (PP's) and polyalphaolefins (PAO's), all of which may be hydrogenated or unhydrogenated; polyether based materials such as polybutylene oxides (poly BO's), polypropylene oxides (poly PO's), polyhexadecene oxides (poly HO's) and mixtures thereof (i.e. both (poly BO)+(poly PO) and poly BO–(PO)); and mineral oils such as those sold by member companies of the Royal Dutch/Shell group under the designations "HVI" and "XHVI" (trade mark), Exxon Naphthenic 900 SUS mineral oil and high viscosity index oils in general.

A carrier fluid, when employed in the composition, may comprise about 1 wt % to about 99.5 wt % of the total weight of the composition. In another embodiment, the carrier fluid comprises about 10 wt % to about 50 wt % of the total weight of the composition. When the composition comprises the fuel detergent PIBA, the carrier fluid and the PIBA may be present in substantially equal amounts by weight in the composition.

In another embodiment, the composition may comprise a polyolefin polymer and/or their corresponding hydrogenated derivatives in an amount effective for controlling valve deposits in engines. In combination with a detergent, for example, such additives may act as total deposit control additives (TDC) to reduce deposits on fuel injectors, valves, and intake ports of internal combustion engines. Suitable polyolefins that can be employed include polymers prepared from monoolefins and diolefins, or copolymers of either having an average molecular weight of about 500 to about 3,500 Da. Olefins, which can be used to prepare such polyolefin polymers, include ethylene, propylene, butene, isobutene, amylene, hexylene, butadiene, and isoprene. In one embodiment, the polyolefin polymer is a hydrogenated polybutene. The hydrogenated polybutenes can have molecular weights of about 700 to about 1100 Da, or about 800 to about 1000 Da.

The composition may comprise other additives such as an agent for reducing soot, a pour point depressant, a cetane improver, tetra-alkyl lead compounds, MMT, lead scavengers such as halo-alkanes, dyes, antioxidants such as hindered phenols, corrosion inhibitors such as alkylated succinic acids and anhydrides and derivatives thereof, bacteriostatic agents, cetane improver, auxiliary dispersants, detergents, gum inhibitors, metal deactivators, emulsifiers, demulsifiers, anti-valve seat recession additives such as alkali metal sulphosuccinate salts, anti-icing agents, lubricating agents, flow improvers, anti-wear additives, and combinations comprising one or more of the foregoing additives.

Suitable antioxidants that can be added to the composition include, for example, metal dithiophosphates and metal dithiocarbonates. One particular antioxidant additive is a phenolic antioxidant, 4,4'-methylene-bis(2,6-di-tertbutyl-phenol), which is commercially available under the tradename ETHYL 702 (Ethyl Corporation). Antioxidants are particularly advantageous when the composition comprises a detergent. An antioxidant, when employed in the composition may comprise from about 0.01 wt % to about 5 wt % of the total weight of the composition.

Anti-wear agents, such as sulfur, metal naphthenates, phosphate esters and sulfurized hydrocarbons, etc., may also be used as in the composition. One such additive is zinc dibutyldithio-carbamate, which is commercially available as BUTYL ZIMATE (R. T. Vanderbuilt Company).

Flow improvers such as anti-gel and cold flow additives including copolymers of ethylene and vinyl esters of fatty acids with molecular weight of 500-50,000 Da; a tallow amine salt of ophthalmic anhydride; tallow amine salt of dithio-benzoic acid; a 4-hdroxy,3,5-di-t-butyl dithiobenzoic acid; or an ethylene-vinyl acetate copolymers may also be added to the composition.

The composition may also comprise a lubricating agent such as, for example, carboxylic acid polyol esters, dimer acid, polyol esters, castor oil, vegetable oils, fatty methyl esters (e.g., rapeseed), glycol esters, particularly oleates and linoleates (unsaturated). Specific examples of lubricating agents include glycerol monooleate, or fatty formates, or fatty amides or 1,2-alkane diols.

Stabilizers such as, for example, a hydrocarbyl polyoxypropylene di(polyoxyethylene) amine may be used in the composition.

Emission (e.g., CO and nitrogen oxide) reducing agents may also be used in the composition. For example, about 0.01 to about 1.0 ppm of fuel-soluble organometallic platinum compound in an oxygenated solvent such as octyl nitrate can be used as an emission reducing additive. Another example of an emission reducing agent includes dibenzyl cyclooctadiene platinum II in octyl nitrate. Mixtures of alcohol, toluene, and hydrogen peroxide may also be employed. A composition comprising an admixture of about 6% of di-tertiary butyl peroxide, about 1% of tall oil imidazoline, about 0.5% of neo-decanoic acid and the balance being a hydrocarbon solvent carrier thoroughly mixed with the peroxide, imidazoline and acid may also be employed as an emission reducing agent.

Demulsifiers, such as, for example, polyoxyethylene ethers, organic sulfonates, polyoxyalkylene glycols, oxyalkylated phenolic resins, and combinations comprising one or more of the foregoing demulsifiers may also be used in the composition. The composition may also comprise fuel dyes (such as Solvent Red 24. Solvent Red 26, Solvent Yellow 124, or Solvent Blue 35), ether, nitromethane, acetone, ferrous picrate, nitrous oxide, methanol, ethanol, isopropyl alcohol, n-butanol, and/or gasoline grade t-butanol.

The composition may comprise a matrix. In one embodiment, the matrix is soluble in the automotive or motor vehicle functional fluid to which the composition is to be added. Illustrative examples of functional fluids include fuels for internal combustion engines, radiator fluids, brake fluids, hydraulic fluids, transmission fluids, power steering fluids, lubricants, and the like. In a preferred embodiment, the functional fluid is diesel fuel. In another embodiment, the matrix need not be soluble in the functional fluid.

In one embodiment, the composition may comprise cobalt hydroxystannate nanoparticles but no other types of nanoparticles. In another embodiment, the composition may comprise only cubic cobalt hydroxystannate nanoparticles and no other types of nanoparticles. In one embodiment, the composition may comprise cobalt hydroxystannate nanoparticles and no other source of metal. In one embodiment, the composition may comprise cobalt hydroxystannate nanoparticles, lead, and no other source of metal. However, in other embodiments, the enhanced liquid fuel may consist essentially of the liquid fuel and the cobalt hydroxystannate nanoparticles.

In one embodiment, the liquid fuel is at least one selected from the group consisting of kerosene fuel, diesel fuel, gasoline fuel, biodiesel fuel, alcohol fuel, and synthetic fuel. Alcohol fuels include, but are not limited to, methanol, ethanol, 1-propanol, isopropanol, n-butanol, isobutanol, tert-butanol, n-pentanol, isoamyl alcohol, and mixtures thereof. Synthetic fuels include, but are not limited to dimethyl ether (DME), fuel produced from processes such as Fischer-Tropsch conversion, methanol to gasoline conversion, or direct coal liquefaction. Preferably the liquid fuel is kerosene fuel, diesel fuel, gasoline fuel, or biodiesel fuel. In one preferred embodiment, the liquid fuel is a diesel fuel.

In one embodiment the enhanced liquid fuel may be used as an automotive fuel. The term 'automotive' as used herein generally refers to motor vehicles used to transport or move people or objects from one location to another as well as to stationary objects powered by internal combustion engines, turbines, fuel cells, batteries and the like. Illustrative motor vehicles, include, but are not limited to, cars, buses, trucks, boats, ships, construction and building equipment, and the like, whether such vehicles are powdered by internal combustion engines, turbines, fuel cells, batteries, or a combination thereof. In other embodiments, the enhanced liquid fuel may be used for trains, aircraft, generators, heaters (space heaters or water heaters), or cooking.

In one embodiment, the method only consists of mixing the cobalt hydroxystannate nanoparticles with the liquid fuel to produce the enhanced liquid fuel. For instance, only cobalt hydroxystannate nanoparticles are mixed with the liquid fuel, and no other compounds are added to the enhanced liquid fuel prior to combustion. In a related embodiment, the method only consists of adding a composition comprising the cobalt hydroxystannate nanoparticles to the liquid fuel to produce the enhanced liquid fuel, and no other compounds are added to the enhanced liquid fuel prior to combustion.

In one embodiment, the liquid fuel and the enhanced liquid fuel is located in a fuel tank, such as on a vehicle, and the method involves adding the cobalt hydroxystannate nanoparticles, or a composition comprising the nanoparticles, directly into the fuel tank. Alternatively, the method may involve mixing the cobalt hydroxystannate nanoparticles, or a composition comprising the nanoparticles, into a volume of liquid fuel, which may later be transferred to a vehicle or machinery for combustion.

In one embodiment, the cobalt hydroxystannate nanoparticles are present in the enhanced liquid fuel with a concentration in a range of 50-200 ppm, preferably 55-150 ppm, more preferably 60-130 ppm, even more preferably 70-120 ppm.

In one embodiment, the liquid fuel and the enhanced liquid fuel have specific gravities having a percent difference of 0.5% or less, preferably 0.4% or less, more preferably 0.3% or less, even more preferably 0.2% or less. As used herein, "percent difference" when comparing two numerical values, refers to the absolute difference between the two values, divided by the average of the two values, all multiplied by 100. In a one embodiment, the enhanced liquid fuel has a specific gravity in a range of 0.7900-0.7950 g/cm$^3$, preferably 0.7901-0.7940 g/cm$^3$, more preferably 0.7902-0.7930 g/cm$^3$.

In one embodiment, a kinematic viscosity of the enhanced liquid fuel is 50-85% greater, preferably 55-82% greater, more preferably 60-8(0% greater than a kinematic viscosity of the liquid fuel. In one embodiment, the enhanced liquid fuel has a kinematic viscosity in a range of 5.75-7.00 mm$^{-2}$·s$^{-1}$, preferably 5.80-6.80 mm$^{-2}$·s$^{-1}$, more preferably 6.00-6.70 mm$^{-2}$·s$^{-1}$.

As used herein, "enhancing the efficiency of a liquid fuel" refers to increasing in the calorific value the liquid fuel. The calorific value may be considered equivalent to heating value or energy value, and is the total energy released as heat when a substance undergoes complete combustion with oxygen under standard conditions.

In one embodiment, adding the cobalt hydroxystannate nanoparticles to a liquid fuel increases the fuel's calorific value. For instance, the calorific value of the enhanced liquid fuel is between 25 and 52 times, preferably between 30 and 50 times, more preferably between 35 and 48 times the calorific value of the liquid fuel. In one embodiment, the enhanced liquid fuel has a calorific value in a range of 20-50 kJ/g, preferably 25-45 kJ/g, more preferably 30-42 kJ/g. For comparison, pure diesel has a calorific value of about 920 J/g. In one embodiment, the calorific values represented herein may be lower heating values (LHV) or higher heating values (HHV).

The cetane number (or CN) is an inverse function of a fuel's ignition delay, the time period between the start of injection and the first identifiable pressure increase during combustion of the fuel. Thus, cetane number is an indicator of the combustion speed of diesel fuel and the compression needed for ignition. It is an inverse of the similar octane rating for gasoline. In a particular diesel engine, higher cetane fuels will have shorter ignition delay periods than lower cetane fuels. In one embodiment, the enhanced liquid fuel has a cetane number of 50 or greater, preferably 51 or greater, more preferably 52 or greater. In one embodiment, the enhanced liquid fuel may have a cetane number in a range of 50-63, 51-62, or 52-61.

In one embodiment, the enhanced liquid fuel may have a lower flash point, fire point, cloud point, and/or pour point than the liquid fuel. The flash point of a volatile material is the lowest temperature at which vapors of the material will ignite, when given an ignition source. In one embodiment, the enhanced liquid fuel has a flash point of 35° C. or lower, preferably 34° C. or lower, more preferably 32° C. or lower, or 31° C., 30° C., 29° C., 28° C., or 27° C. Pure diesel may have a flash point of about 42° C. Methods for determining the flash point of a liquid are specified in many standards. For example, testing by the Pensky-Martens closed cup method is detailed in ASTM D93, IP34, ISO 2719, DIN 51758, JIS K2265 and AFNOR M07-019. Determination of flash point by the small scale closed cup method is detailed in ASTM D3828 and D3278, EN ISO 3679 and 3680, and IP 523 and 524. CEN/TR 15138 *Guide to Flash Point Testing* and ISO TR 29662 *Guidance for Flash Point Testing* cover the key aspects of flash point testing.

The fire point of a fuel is the lowest temperature at which the vapor of that fuel will continue to burn for at least 5 seconds after ignition by an open flame of standard dimension. At the flash point, a lower temperature, a substance will ignite briefly, but vapor might not be produced at a rate to sustain the fire. The fire point may be measured according to the ASTM D92 standard. In one embodiment, the enhanced liquid fuel has a fire point of 43° C. or lower, preferably 42° C. or lower, more preferably 41° C. or lower, even more preferably 40° C. or lower, or 39° C., 38° C. 37° C., 36° C., or 35° C. Pure diesel may have a fire point of about 46° C.

The cloud point refers to the temperature below which wax in a liquid fuel forms a cloudy appearance. The presence of solidified waxes thickens the fuel and clogs fuel filters and injectors in engines. The wax also accumulates on cold surfaces (producing, for example, pipeline or heat exchanger fouling) and forms an emulsion with water. Therefore, cloud point indicates the tendency of the fuel to plug filters or small orifices at cold operating temperatures. In one embodiment, the enhanced liquid fuel has a cloud point of 7° C. or lower, preferably 6° C. or lower, more preferably 5° C. or lower, even more preferably 4° C. or lower, 3° C. or lower, 2° C. or lower, or 1° C., 0° C., –1° C., or –2° C. The cloud point of pure diesel may be about 9° C. The cloud point may be measured manually by the ASTM D2500 standard or automatically by the ASTM D5773 standard.

The pour point of a liquid is the temperature below which the liquid loses its flow characteristics, and may be measured manually by the ASTM D97 standard or automatically by the ASTM D5949 standard. In one embodiment, the enhanced liquid fuel has a pour point of –10° C. or lower, preferably –15° C. or lower, more preferably –25° C. or lower, even more preferably –30° C. or lower, or –32° C., or –35° C., or –40° C. The pour point of pure diesel may be about –5° C.

The examples below are intended to further illustrate protocols for preparing, characterizing cobalt hydroxystannate nanocubes, and uses thereof, and are not intended to limit the scope of the claims.

Example 1

Materials and Methods

Hydrated salts of chloride as stannic chloride (SnCl$_4$·5H$_2$O), cobalt chloride (CoCl$_2$·6H$_2$O), pellets of sodium hydroxide (NaOH), and phenyl hydrazine were purchased from Sigma-Aldrich USA and used in the experiment without any further purification. All mentioned chemicals were analytical grade. Deionized water with a resistivity of 18.9 MΩ·cm$^{-1}$ was used throughout the experiment.

Example 2

Synthesis of Cobalt Hydroxystannate Nanocubes

Nanocubes of cobalt hydroxystannate were synthesized by a hydrothermal methodology. In a typical procedure, 0.6 g stannic chloride (SnCl$_4$·5H$_2$O) and 0.7 g cobalt chloride (CoCl$_2$·6H$_2$O) were dissolved in 60 mL of deionized water during magnetic stirring for 55 min until they were completely dissolved. Then 10 mL of 5 M solution of NaOH was added drop-wise into the solution during stirring for 40 min, and the color of the solution changed from light pink to light blue. Subsequently, the solution was stirred for 60 min and then the color of the solution changed from light blue to light green with the oily layer. All the steps of the reaction were carried out at room temperature. The solution was vigorously stirred for another 20 min and then the solution was shifted into a 100 mL capacity Teflon,® lined stainless steel hydrothermal reactor autoclave and maintained at the temperature of the electric furnace at 180° C. for 6 h. After natural cooling of autoclave, the product was collected and washed with absolute ethanol and deionized water several times by centrifugation at 4000 rpm. After washing, the product was placed into an oven at 60° C. for overnight drying. The product, after drying, was placed into a furnace for calcination at 450° C. for 5 h.

Example 3

Characterization

The powder XRD patterns of the product were obtained from the prepared sample on a Rigaku D/max Ultima III X-ray diffractometer with a Cu-Ka radiation source (k=1.54174 Å) at 45 kV and 60 Ma at a scanning step size of 0.030° in the 2 h range 10.015°-79.982°. Scanning electron microscopic (SEM) observations were performed at Quanta 250 at a pressure of 70 Pa and 30 kV power. Catalytic reduction and absorption spectrum of anthraquinone dye drimarene red K-4BL was studied by a Halo DB 20 double beam spectrophotometer at a wavelength of 200-800 nm. Flash and fire point was supervised by APEXJCX309 Closed Cup Flash Point Tester. Specific gravity values were measured by Gravity meter DA-640 and calorific values were estimated by APEX-JCX406 Oxygen Bomb Calorimeter.

Example 4

Result and Discussion

X-Ray Powder Diffraction

Figure 2A:
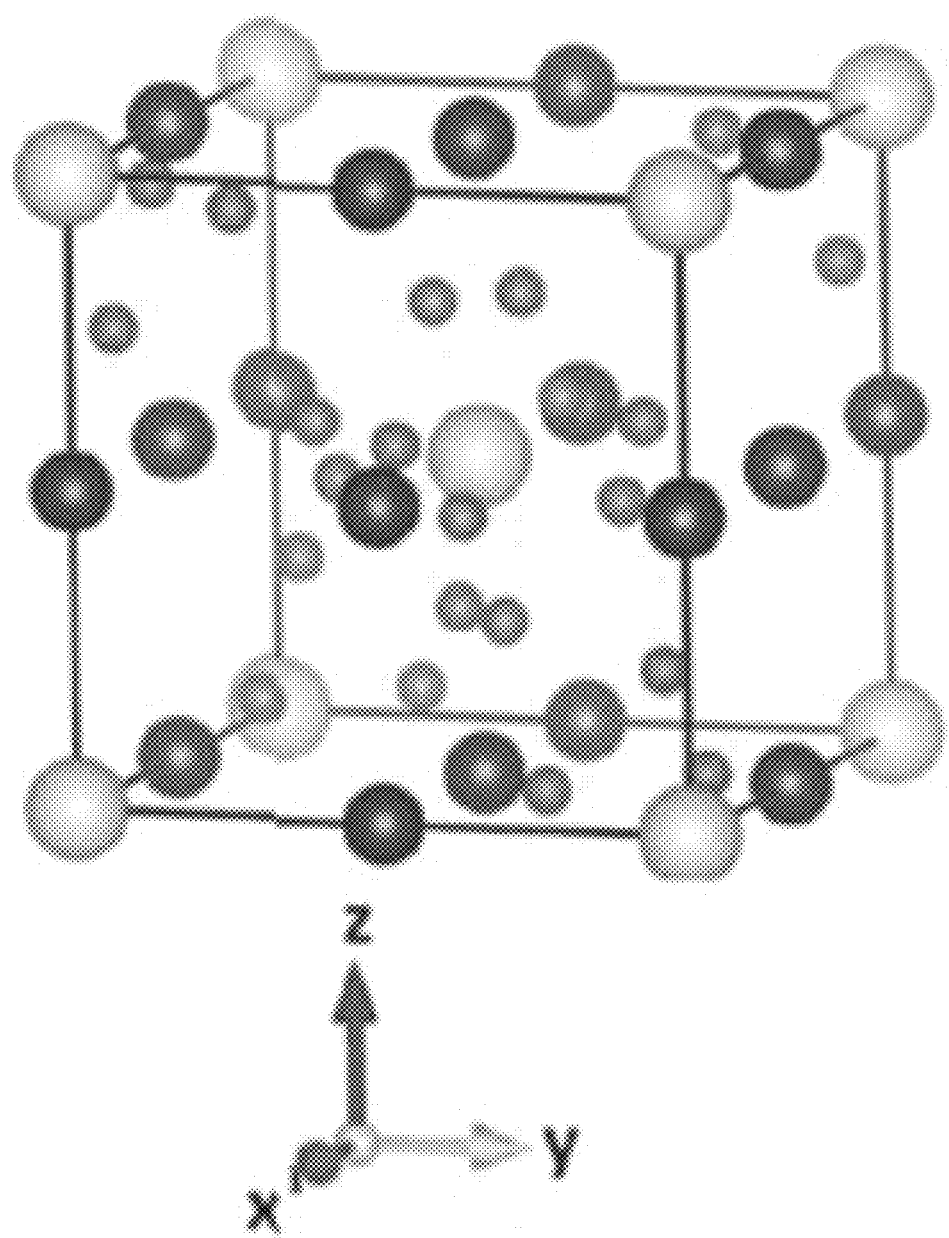
FIGS. 2A-2G are structural models of $CoSn(OH)_6$.
Figure 2B:
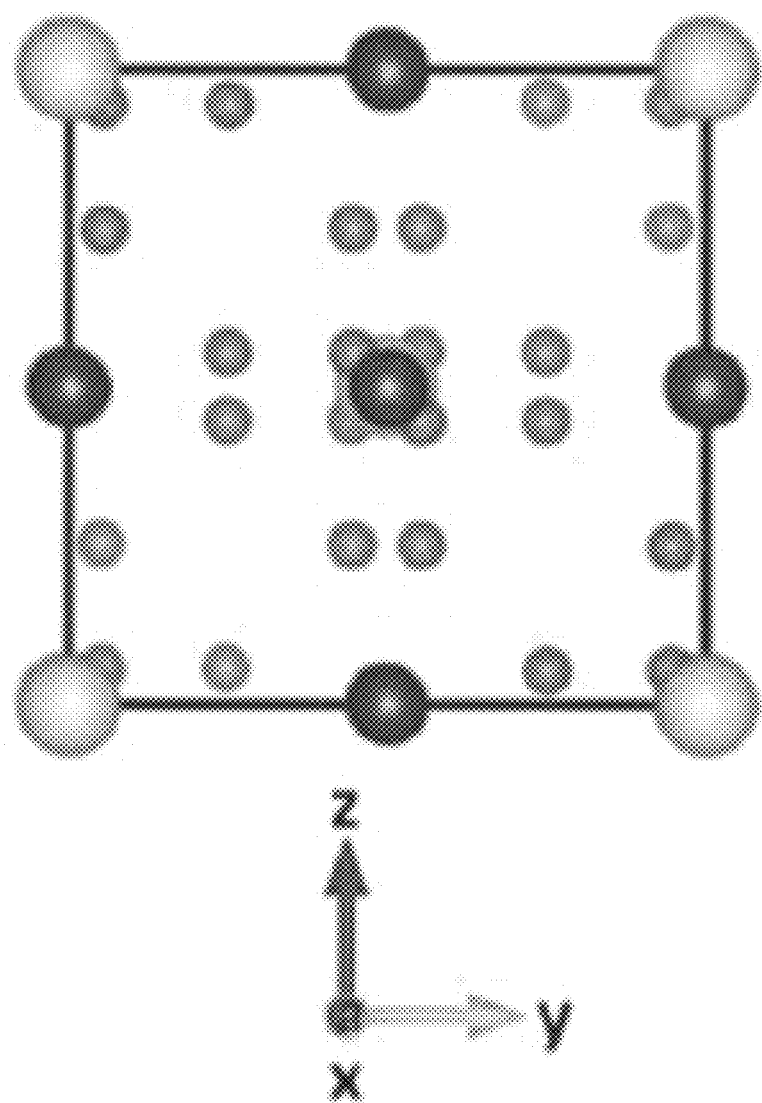
Figure 2C:
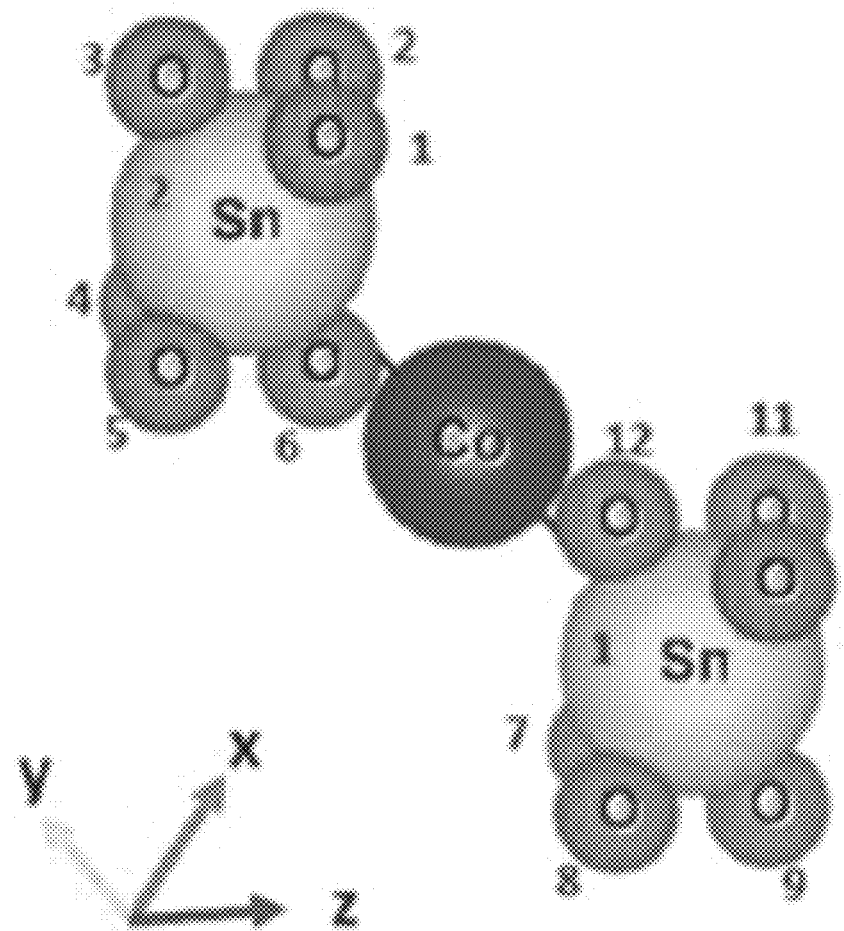
Figure 2D:
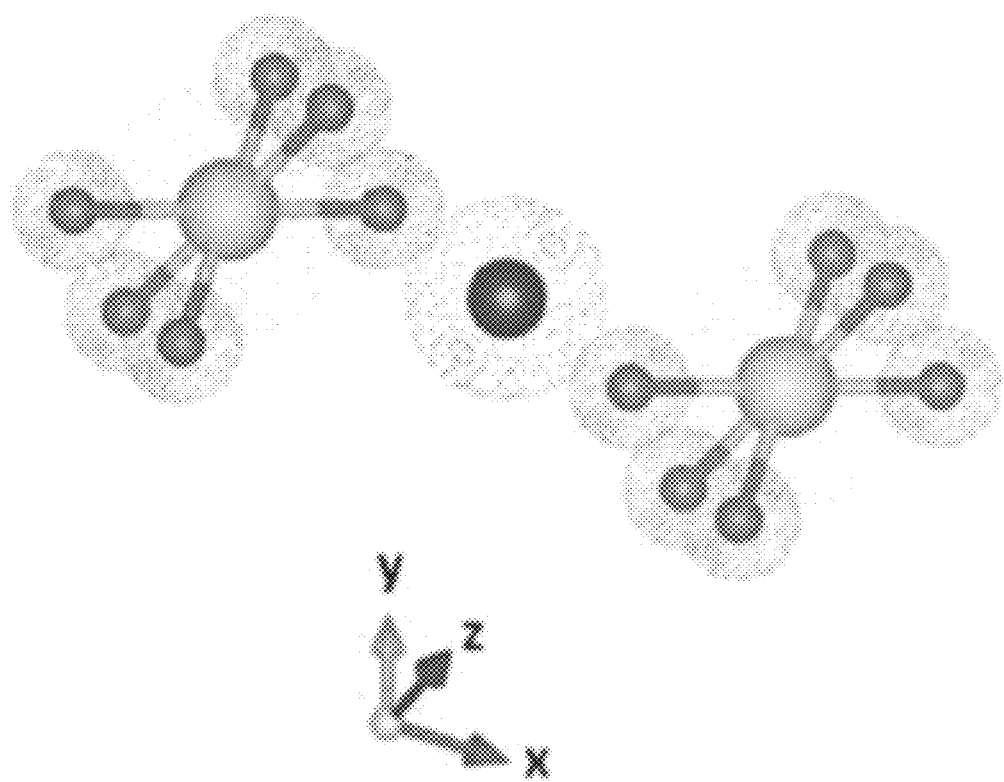
Figure 2E:
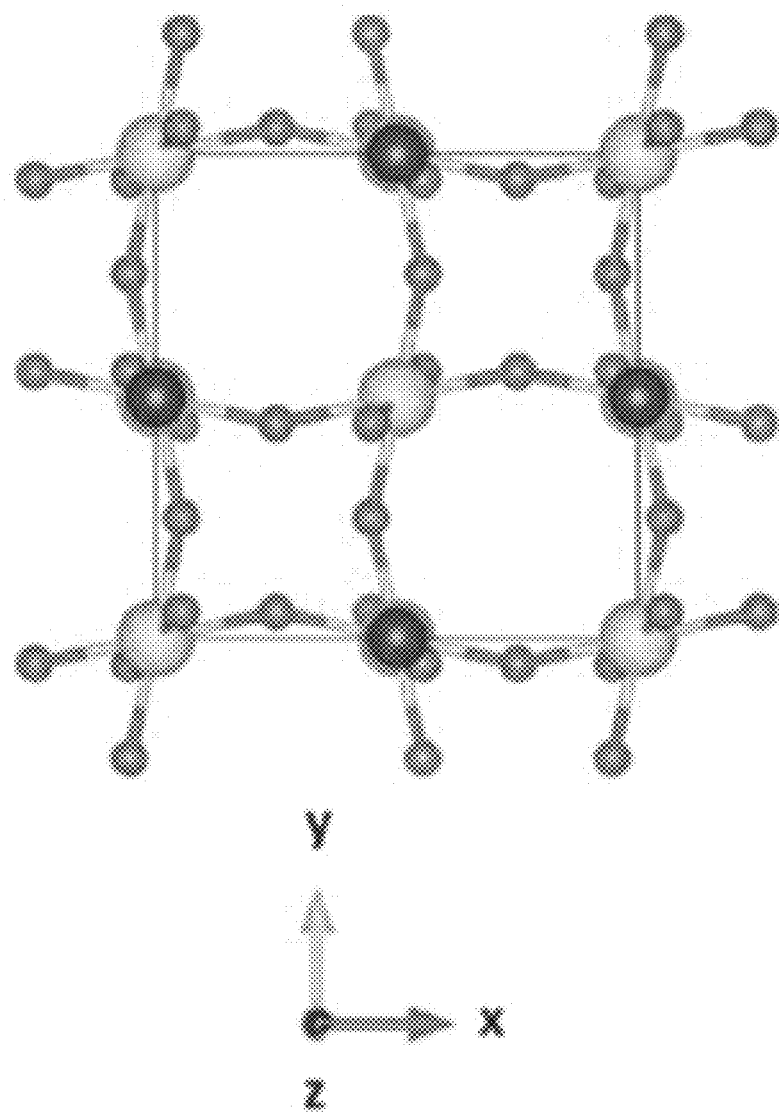
Figure 2F:
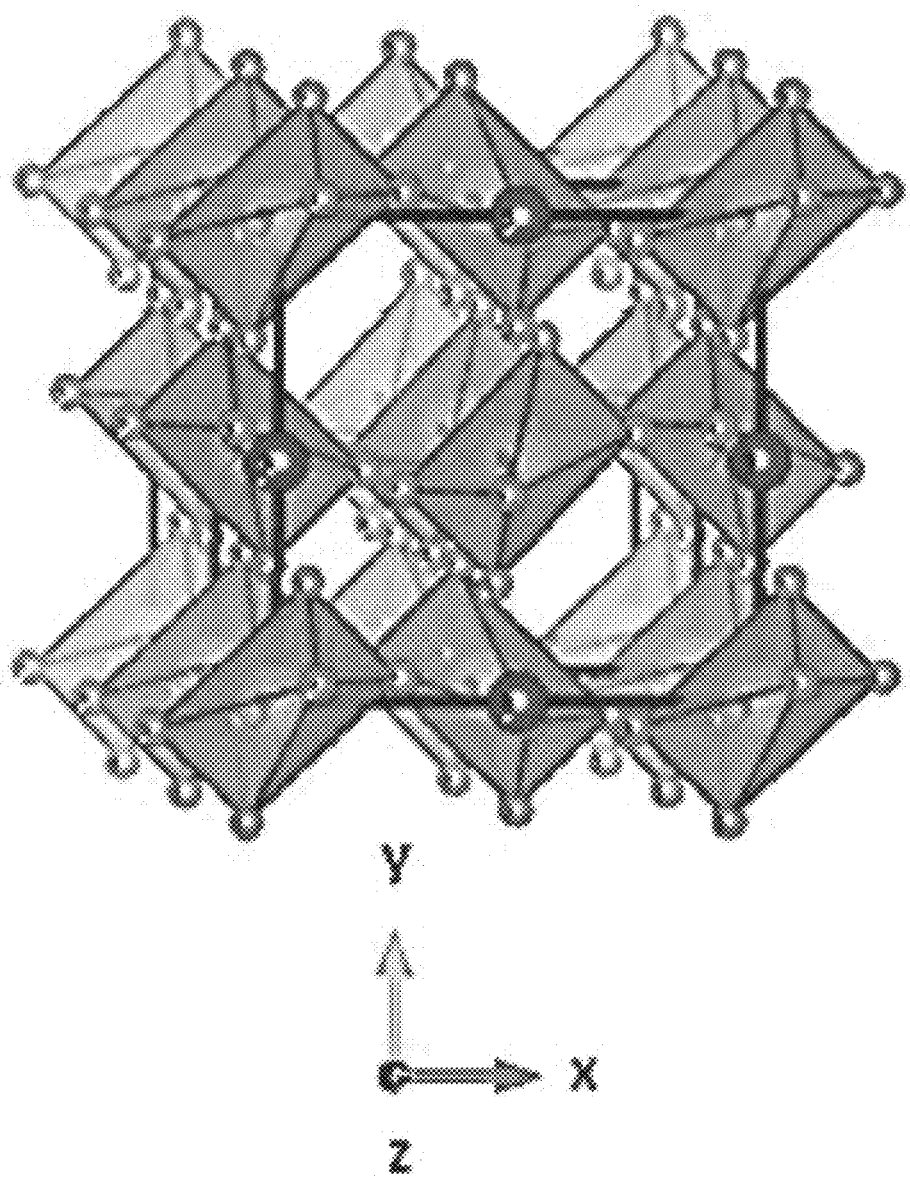
Figure 2G:
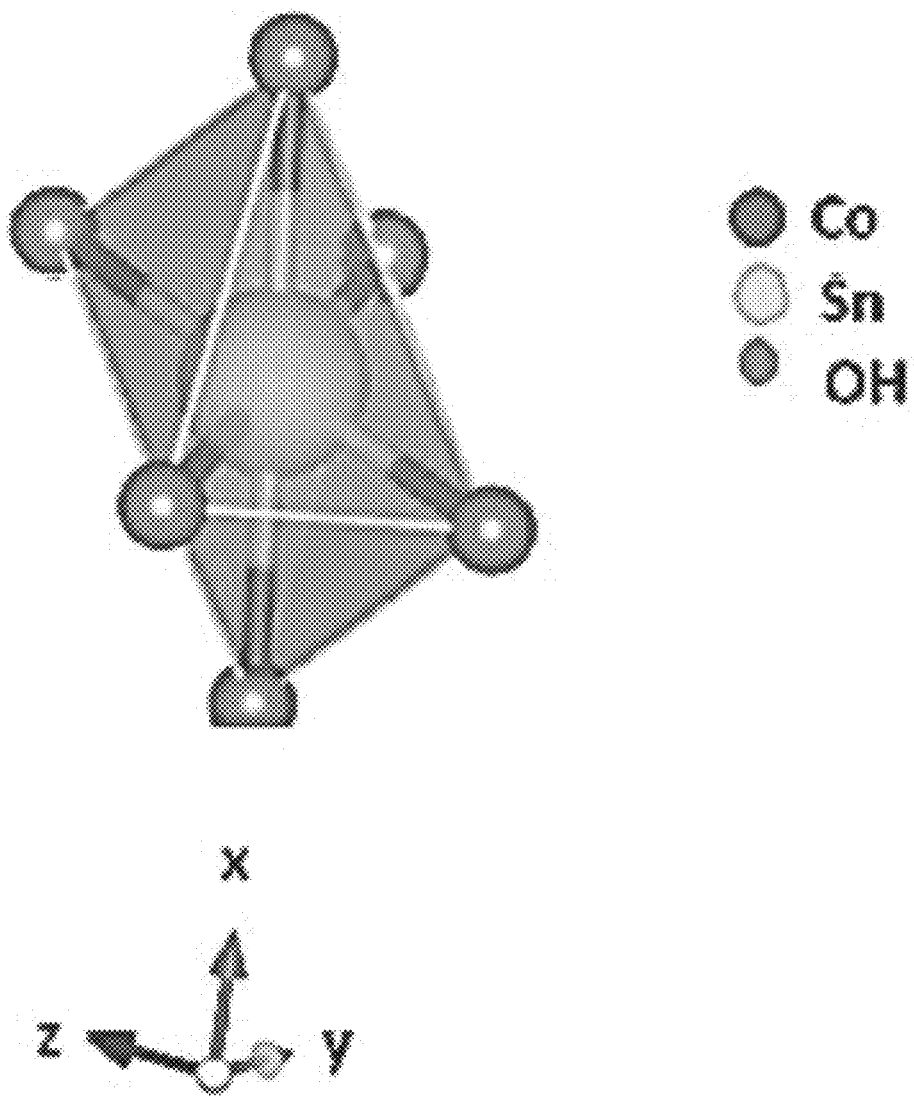

X-ray diffraction (XRD) pattern of $CoSn(OH)_6$ is shown in FIG. 1. The strong and sharp diffraction peaks illustrate that the product is well crystallized. Strong and sharp diffraction peaks are present at 2-theta values 19.731°, 22.821°, 32.541°, 38.335°, 40.153°, 46.812°, 51.504°, and 58.241°, which are associated with planes (111), (200), (220), (310), (222), (400), (420), and (422), respectively. These sharp diffraction peaks indicate the characteristic of prepared bimetallic hydroxide (JCPDS No 96-901-1041). The detail of crystal parameters, cell parameters, atomic co-ordinates, lattice parameters space group, bond angels, bond lengths, volume, density, and d-spacing are shown in Table 1. Study of diffraction peaks describes that synthesized $CoSn(OH)_6$ possesses a tetragonal lattice with space group of P n-3 m. Cobalt atoms are located at the center of the cubic unit cell as shown in FIGS. 2A and 2B. Positions of atoms in one unit cell are shown in FIGS. 2A and 2B. In FIG. 2C, tin atoms located at the corners of the crystal lattice are bonded with six hydrogen and oxygen atoms which is shown in FIG. 2D each tin atom bonded with hydrogen and oxygen at different angles makes a tetragonal lattice of $CoSn(OH)_6$ which is diagrammatically shown in FIG. 2E these tetragonal lattices bonded with tin, oxygen, and hydrogen atom at octahedral positions and makes octahedron as shown in FIG. 2E. From this diagram it is clearly seen that every atom is connected to each other at different angles or distances. A single polyhedron is shown as FIG. 2G.

TABLE 1

Description of various structural parameters of product obtained from XRD data analysis

| Parameters | Results |
| --- | --- |
| Space group | P n - 3 m |
| Space group number | (224) |
| Crystal system | Cubic |

TABLE 1-continued

Description of various structural parameters of product obtained from XRD data analysis

| Parameters | Results |
| --- | --- |
| Cell parameters | |
| a (Å) and x (°) | 7.7800 and 90.000 |
| Atomic coordinates | |
| x, y and z coordinates of Sn | 0.000, 0.000 and 0.000 |
| x, y and z coordinates of Co | 0.500, 0.500 and 0.500 |
| x, y and z coordinates of O | 0.054, 0.054 and 0.250 |
| Calculated density (g/cm$^3$) | 3.64300 |
| 2-theta (°), d-spacing (Å) and miller indices (hkl) | 19.731, 4.4994 and (111) |
| | 22.821, 3.8969 and (200) |
| | 32.541, 2.7519 and (220) |
| | 38.335, 2.3486 and (310) |
| | 40.153, 2.2457 and (222) |
| | 46.812, 1.9407 and (400) |
| | 51.504, 1.7865 and (420) |
| | 58.241, 1.5842 and (422) |
| Bond distances (Å) | |
| Sn—Sn | 2.03372 |
| Sn—Co | 3.89000 |
| Sn—O(1-12) | 2.03372 |
| Co—O | 3.93511 |
| O—Co | 3.49522 |
| Bond angles (°) | |
| Sn—Co—Sn | 180.000 |
| Sn—Co—O(1) | 16.9863 |
| Sn—Co—O(2,3) | 78.0721 |
| Sn—Co—O(4,10) | 163.013 |
| Sn—Co—O(5,6,11,12) | 101.921 |
| Sn—Co—O(7) | 16.9861 |
| Sn—Co—O(8,9) | 78.0721 |

Scanning Electron Microscopic Analysis

Figure 3A:
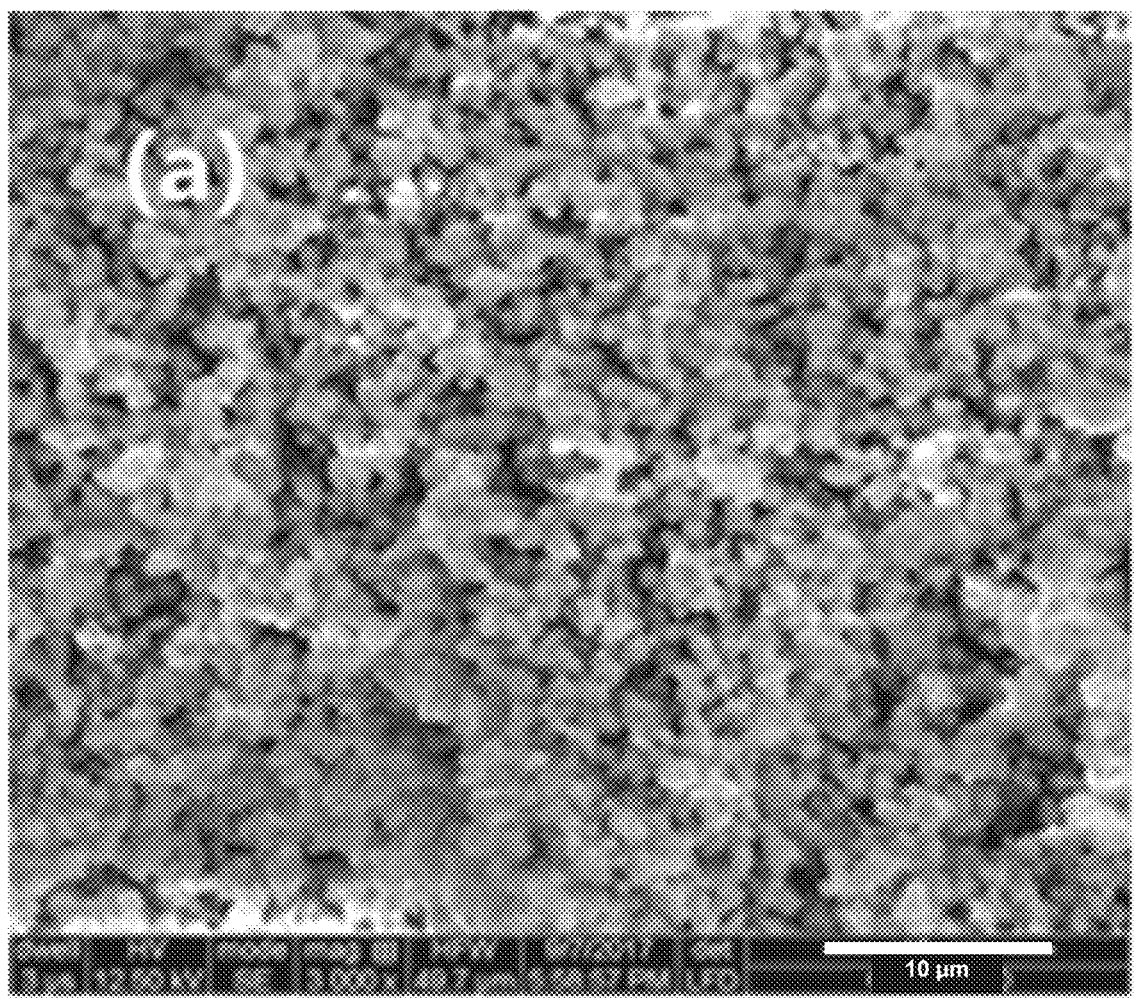
FIGS. 3A-3D are SEM images of synthesized cobalt hydroxystannate nanoparticles before calcination (3A, 3B) and after calcination (3C, 3D).
Figure 3B:
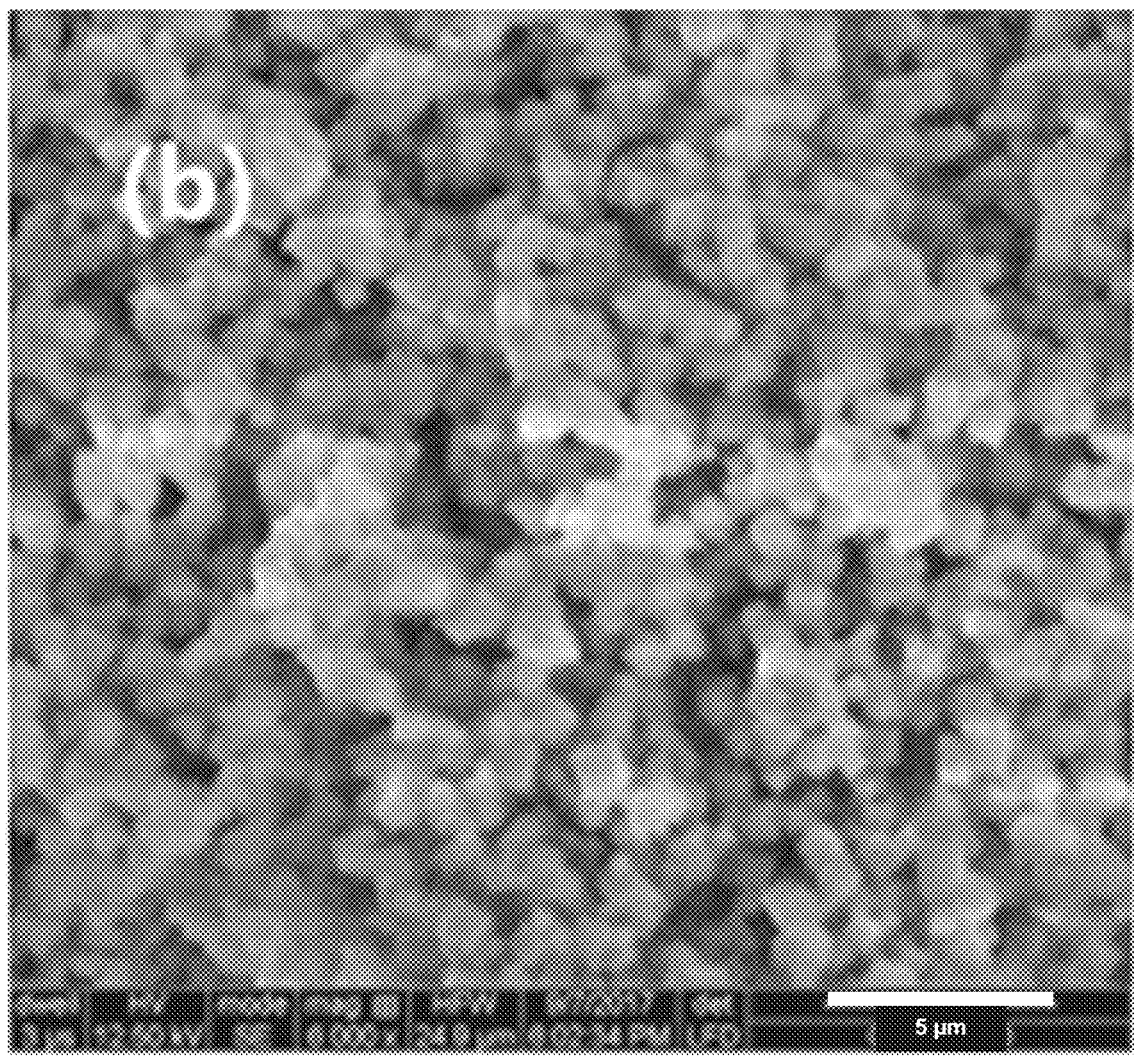
Figure 3C:
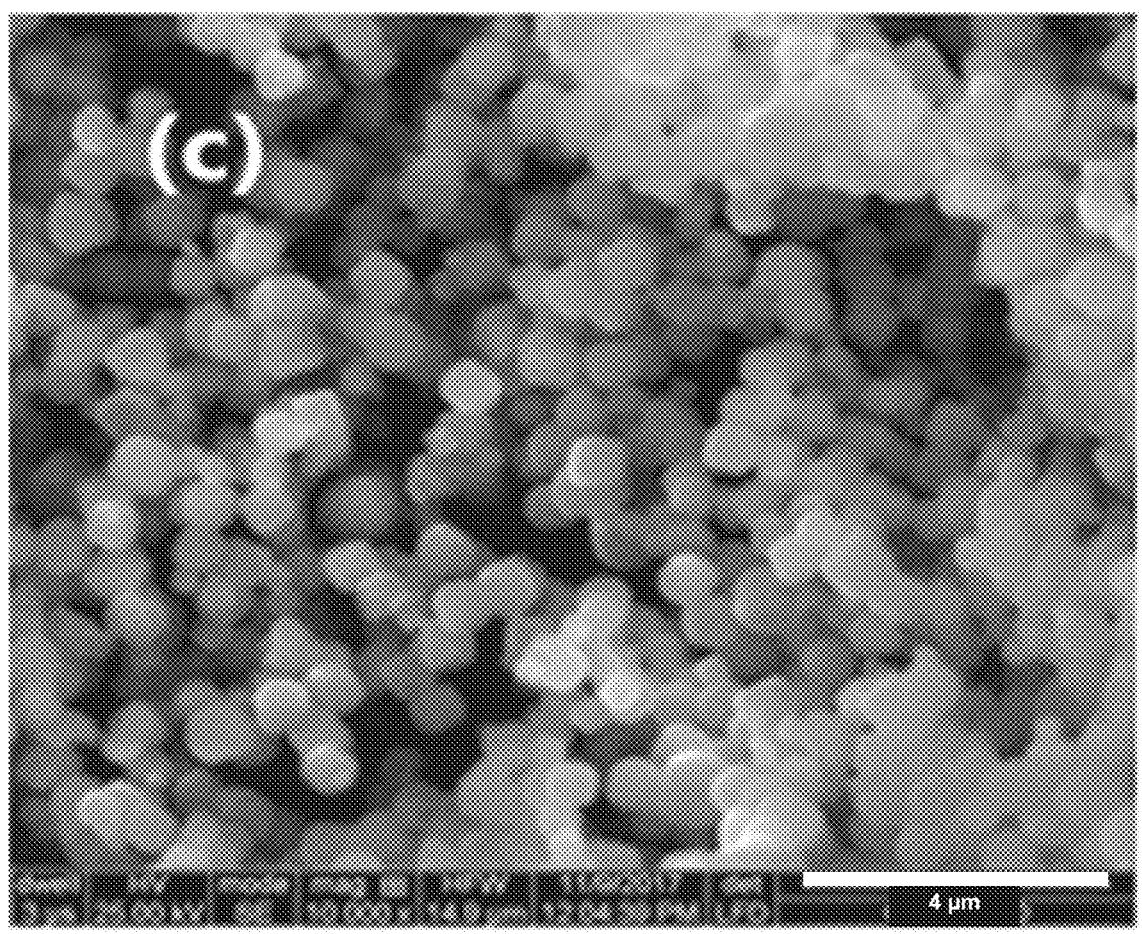
Figure 3D:
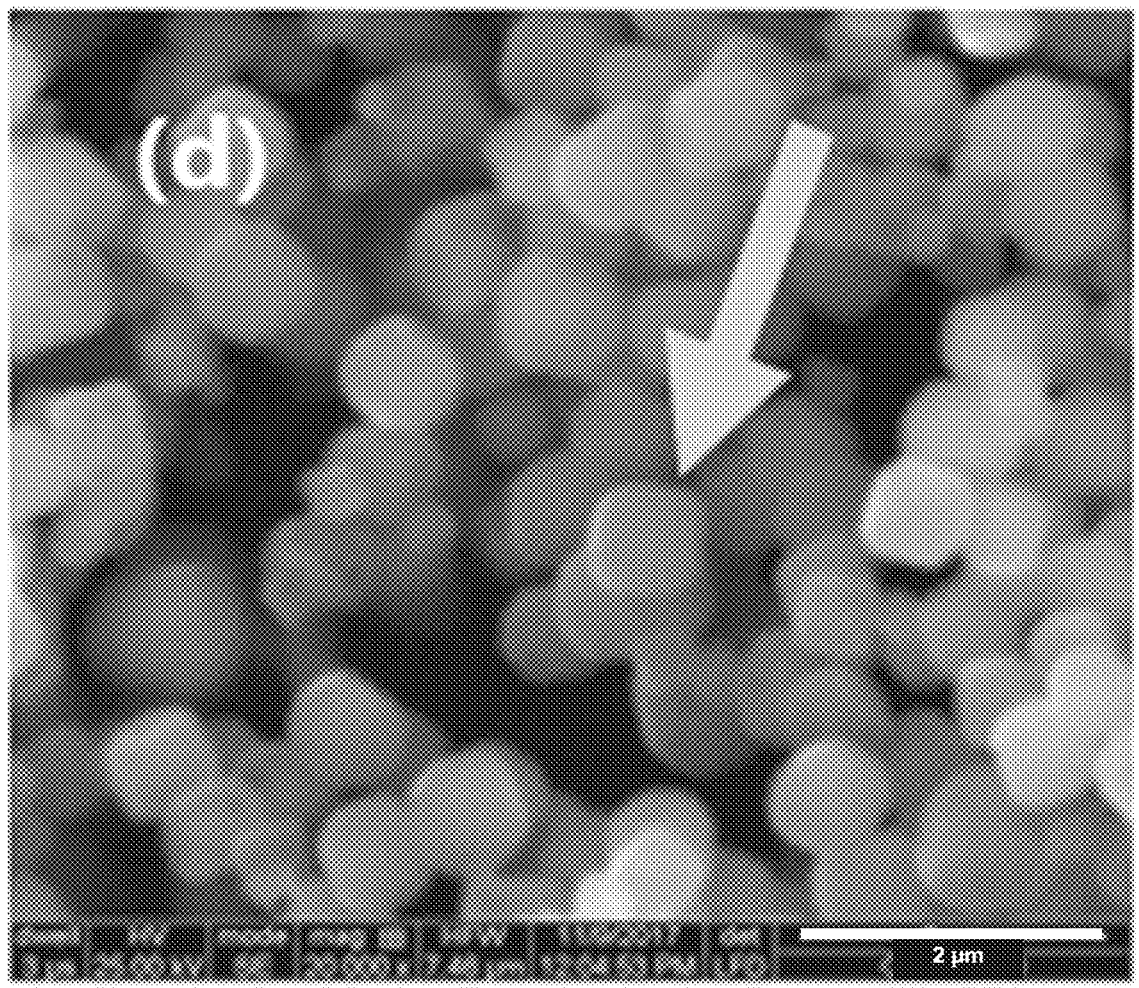
Figure 4A:
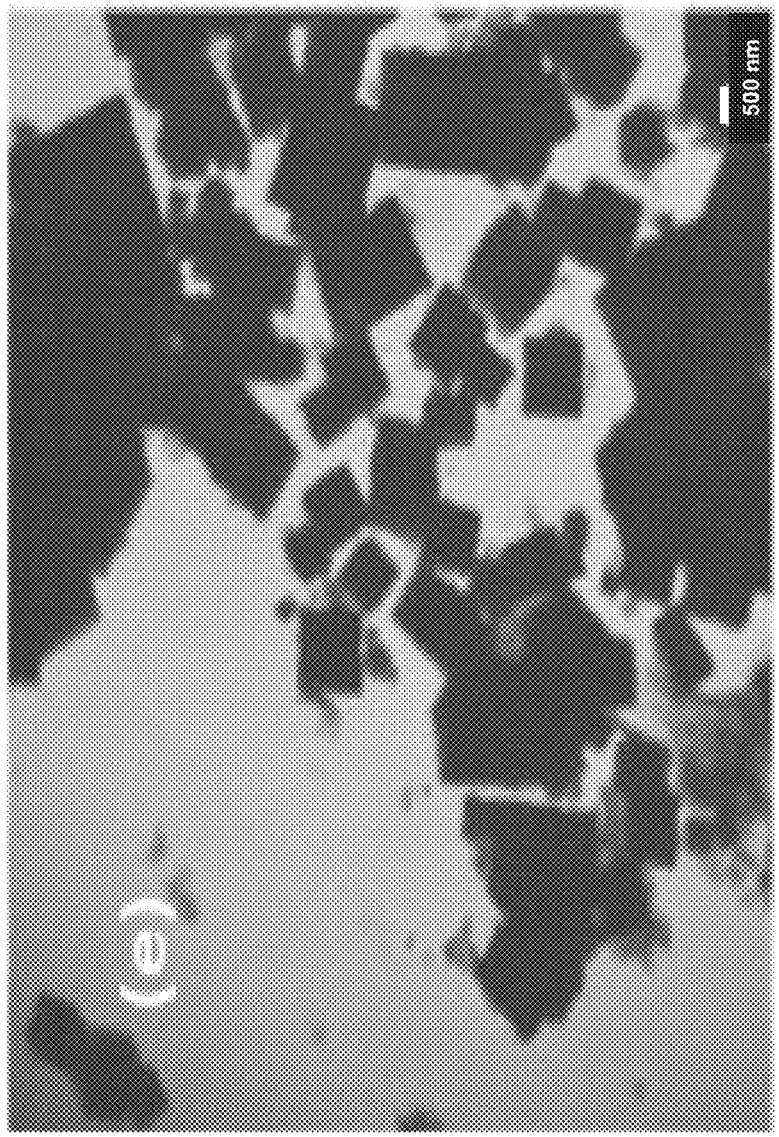
FIGS. 4A-4D are TEM images of synthesized cobalt hydroxystannate nanoparticles at different magnifications; 4A and 4B are overviews of the product, and 4C and 4D are higher resolution TEM images.
Figure 4B:
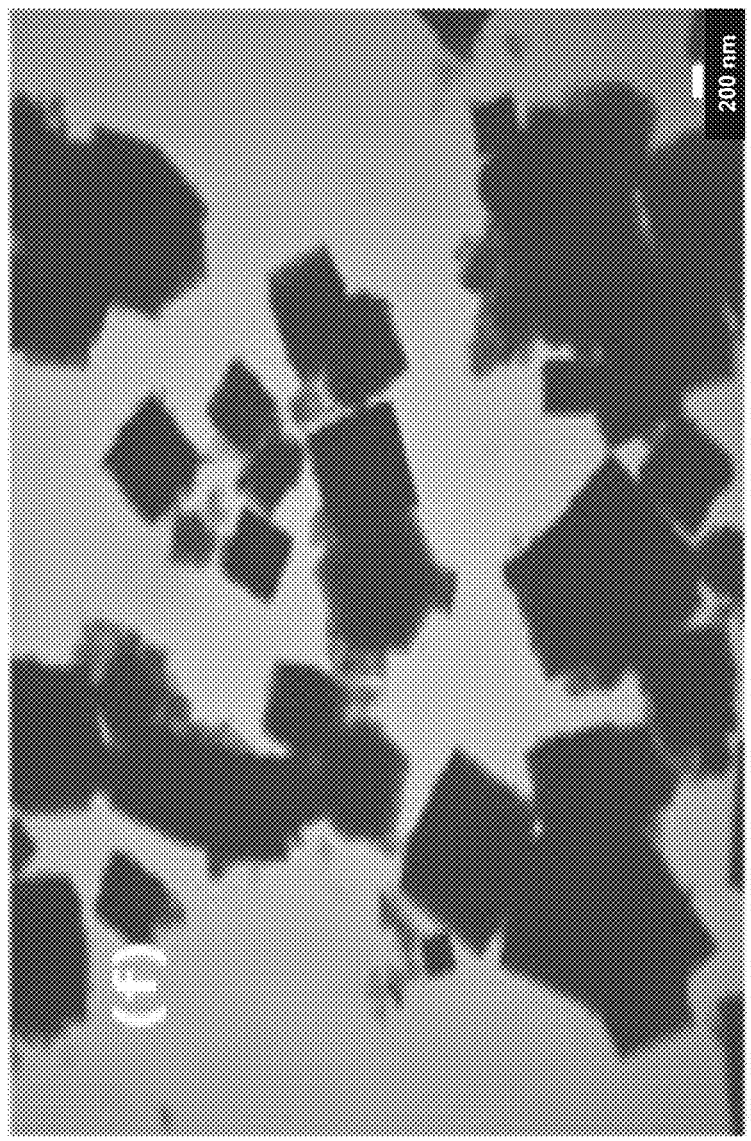
Figure 4C:
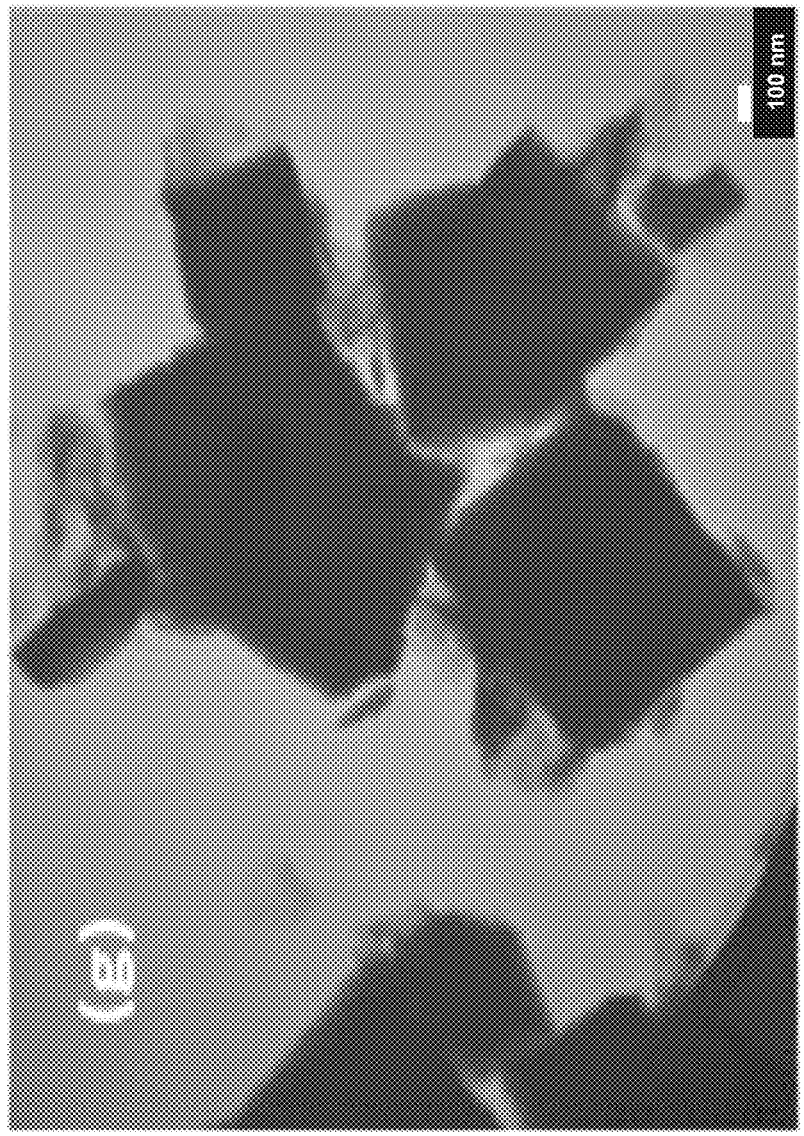
Figure 4D:
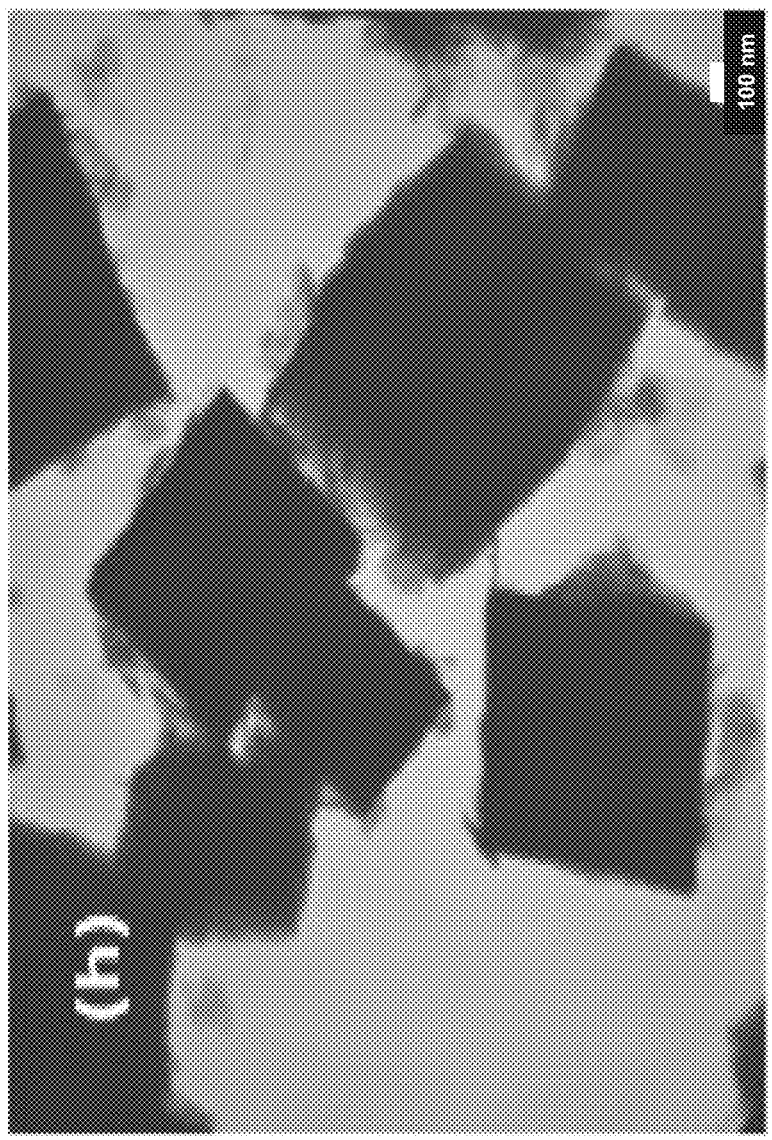

The SEM images of synthesized $CoSn(OH)_6$ nanoparticles at different domains are shown in FIGS. 3A-3D. In the overall view, agglomerates of cubic particles are shown in FIGS. 3A and 3B, in this figure before calcination nanoparticles at 5 and 10 micrometer scale with 3,000× and 6.000× magnification and at 250 quanta particles are not completely separated from each other but the complete edges can be seen in both (a) and (b) images of FIG. 3 due to some moisture in it. In the presence of gold coating at 250 quanta well manner scattered cubic shape nanoparticles in the range of 2 and 4 μm with the high magnification of 20,000× and 10,000× respectively with rough edges can be seen in FIGS. 3C and 3D which shows that the product comprises compact cubes of cobalt hydroxystannate. The rough edges of the cubes are due to the calcination at high temperature. This view shows that all the nanoparticles are separated from each other and some are in the form of agglomerates. The magnified view of the particles is shown in FIG. 3D. A close view of the particles shows that the particles are in cube-like shapes. The size of these cubic particles is in the range of 70-200 nm. The particle surface looks smooth and clean, which is indicated by the arrow. Some researchers have reported the single metal oxide cubic shape particles and discussed the broken parts of the particles but in the case of bimetallic hydroxides, clear and smooth surfaces of cube-like particles are evident in FIGS. 3A-3D. See M. U. Khalid, S. R. Khan, and S. Jamil (2018). *J. Inorg. Organomet. Polym. Mater.* 28, 168, incorporated herein by reference in its entirety.

Transmission Electron Microscopic (TEM) Analysis

To investigate in more detail and to affirm the morphology of cobalt hydroxystannate nanoparticles, TEM images at different magnifications are shown in FIGS. 4A-4D. It can be clearly seen from the images of FIGS. 4A and 4B that at 100 and 200 nm with the magnification of 50,000× and 20,000×, respectively, the particles are in cubic shapes with neat and complete edges after being calcined at 450° C. for 5 h. In the case of simple Co oxide nanoparticles, the cubic shape particles are not compacted and show pores in their cube, these pores may reduce the compatibility and damage the surface area of the product, but in cobalt hydroxystannate nanoparticles, the shapes are compact, regular, and uniform. See S. Jamil, X. Jing, J. Wang, J. Liu, and M. Zhang (2013). *Mater. Res. Bull.* 48, 4513, incorporated herein by reference in its entirety. TEM images confirm all previous results shown by SEM and XRD of the product.

Formation Mechanism

After reaction of stannic chloride and cobalt chloride in 60 mL of water in the presence of 10 mL of 5 mol L$^{-1}$ solution of NaOH. This solution may contain some impurities in the form of chloride ions. pH was maintained during washing of the solution by centrifuge process to remove the chloride ions and some oily particles that may be due to some impurities in the solution. So, the procedure of centrifugation is done to remove these impurities and to get the pure product of cobalt hydroxystannates. The possible chemical reaction involve in product formation is given as Eq. (1).

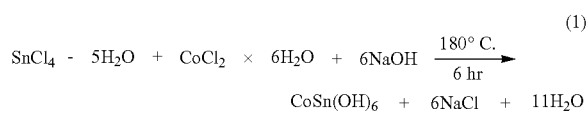

Figure 5:
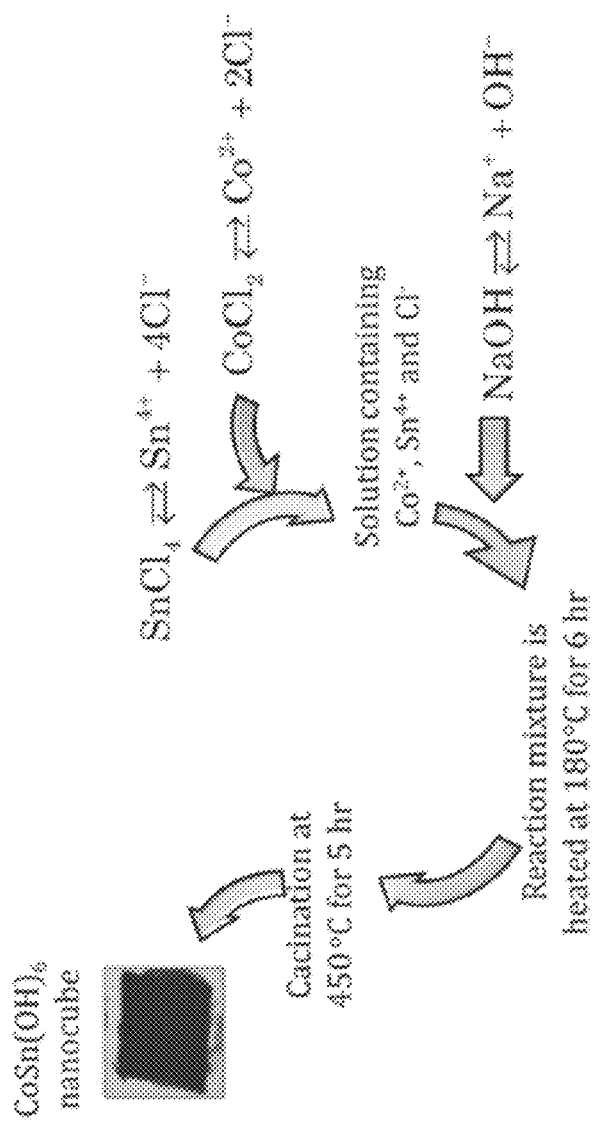
FIG. 5 shows a formation mechanism of $CoSn(OH)_6$ nanocubes.

The above schematic representation shows the formation mechanism of CoSn(OH, nanoparticles. Mechanism shows that after reaction of cobalt and tin ions in the presence of hydroxyl groups, agglomerates of nanocubes are formed. The sharp corners of the nanocubes after calcination can be seen from TEM images (FIGS. 4A-4D). When thermal treatment is applied with high pressure in the autoclave, then cubic unit cells arrange in the form of nanocube. After calcination, each nanocube is separated from each other (FIG. 5).

Example 5

Catalytic Applications
Catalytic Degradation of Drimarene Red K-4BL Dye

Figure 6:
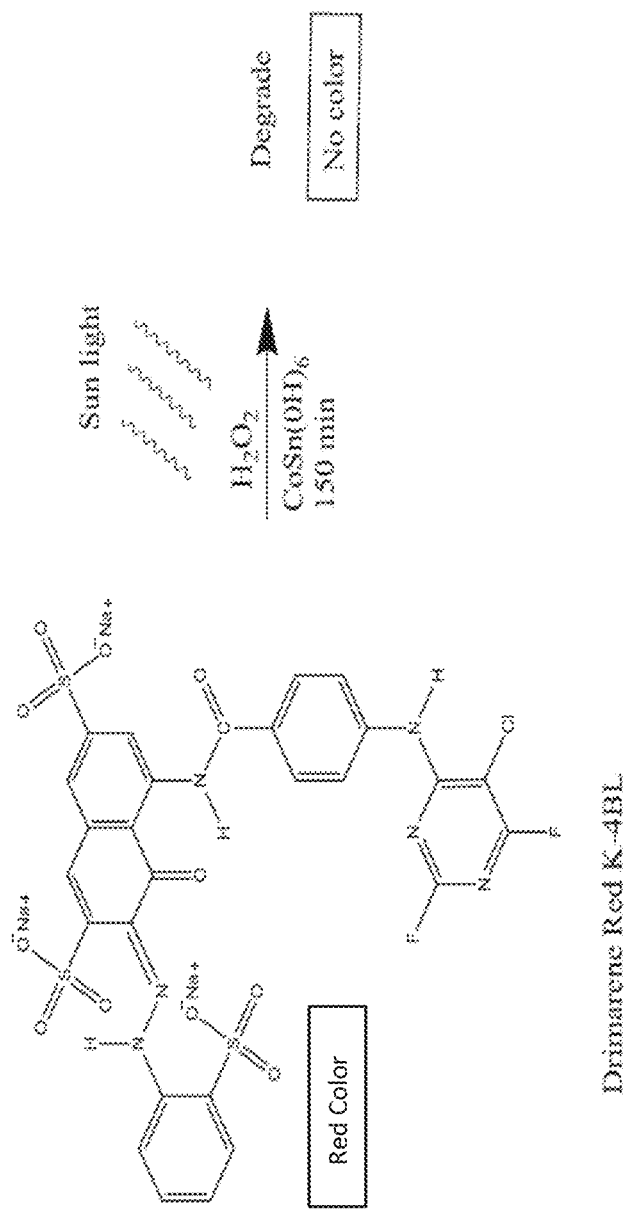
FIG. 6 illustrates the degradation of drimarene red K-4BL dye under the sunlight in the presence of the catalyst and $H_2O_2$.

Drimarene K dyes is a cold water fiber reactive dye, suitable for dyeing silk, linen, rayon, as well as all cellulose fibers, and cotton. It is not suitable for fabric that has been coated with different resins. Drimarene-K dyes have a unique property of stability in water solutions. In solution form, it remains active for many days, and due to its toxicity and persistence it causes a serious environmental effect. Thus, its removal from waste water is a serious concern among scientists. See C. Tizaoui, N. Karodia, and M. Aburowais (2010). *J. Chem. Technol. Biotechnol.* 85, 234, incorporated herein by reference in its entirety. That is why drimarene red K-4BL dye was chosen to test its removal from waste water and to explore the catalytic properties of newly synthesized nanocubes as a model reaction by photodegradation process. Structure of the drimarene Red K-4BL and all the process of dye degradation in the presence of sun light are summarized in FIG. 6. It can be seen that dye is fully degraded within 3 h in the presence of catalyst.

The catalytic reduction of drimarene red K-4BL dye was studied with the help of U-2900 UV/VIS spectrophotometer because drimarene red K-4BL dye with 20 ppm solution strongly absorbs at 520 nm with the absorbance of 0.654 which is maximum. The degradation of this dye was studied in the absence of nanoparticles, but the absorbance at 520 nm did not change with time. This shows that degradation of dye is not possible without catalyst. Photodegradation of dye in the presence of a catalyst was carried out with different amounts of $H_2O_2$, and it follows pseudo first order kinetics of chemistry.

Figure 7:
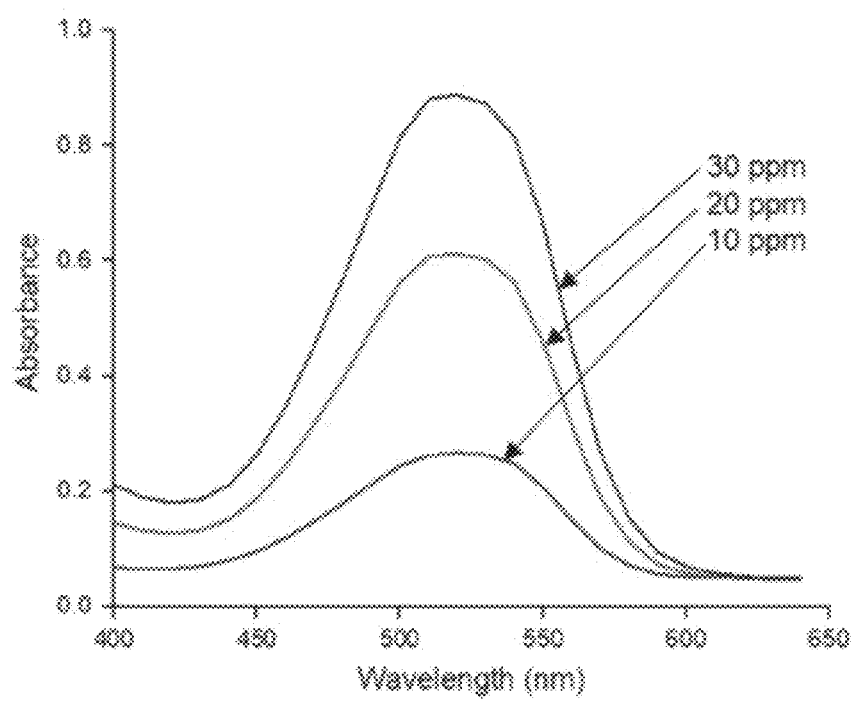
FIG. 7 is UV-Vis spectra comparing the dye absorbance at different concentrations at 0.50 mg $mL^{-1}$ of catalyst and 2 mL of $H_2O_2$.

The UV-Visible spectra of drimarene red K-4BL dye in the absence of catalyst at different concentration of dye is shown in FIG. 7. It can be observed that 10, 20, and 30 ppm dye solutions give 0.267, 0.654, and 0.889 absorbance values respectively at a wavelength of 520 nm. It also shows that by increasing dye concentration, the absorption value increases significantly. So, the maximum concentration of 30 ppm is chosen for further study of different parameters in the presence of synthesized catalyst as well as $H_2O_2$. The reason of selection of high concentration dye is that, in bulk, we may have to face higher concentration dye degradation, so we can apply this on high as well as low concentration. It may take more time but at the same time it will give more accurate results due to the maximum time intervals of dye degradation.

Time Dependent Ultraviolet-Visible Spectra

Figure 8:
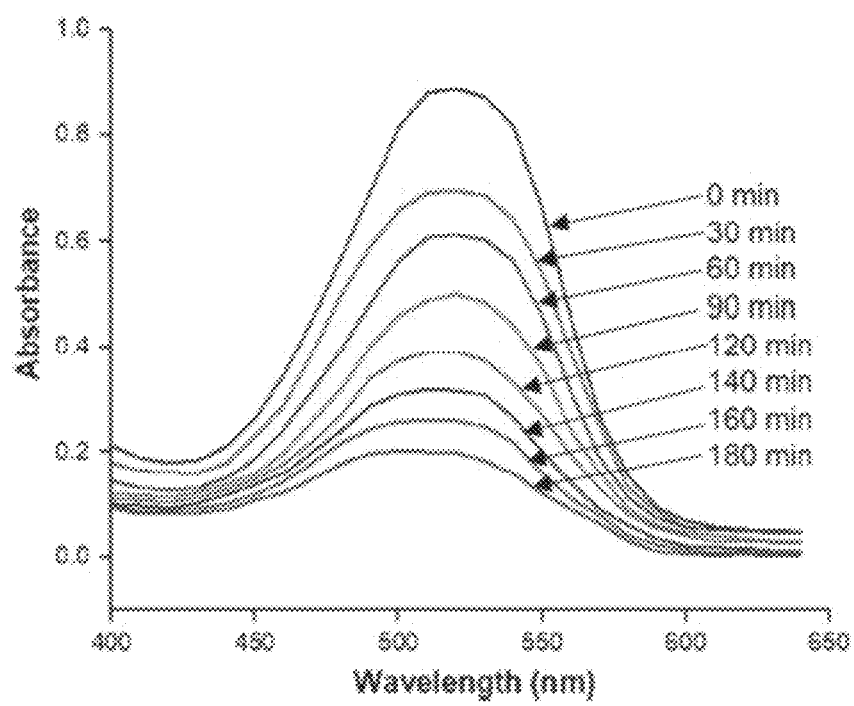
FIG. 8 is UV-Vis spectra of the photocatalytic degradation of the drimarene red K-4BL dye at different time intervals under sunlight (conditions: dye=30 ppm, [$H_2O_2$]=0.5 M, [catalyst]=0.70 mg $mL^{-1}$)

UV-Visible spectra of photocatalytic degradation of drimarene red K-4BL dye at different time intervals in the presence of 0.50 mg mL$^{-1}$ of synthesized nanocatalyst is shown in FIG. 8. It is seen from these graphs that at start when 0.5 M of $H_2O_2$ was added in the presence of catalyst the absorbance at 520 nm was 0.889, but as the time passes absorbance at 520 nm was decreased to 0.209 after 180 min stirring under sunlight irradiation. This shows that the dye has degraded in the presence of sunlight.

Effect of Catalyst Dosage

Figure 9:
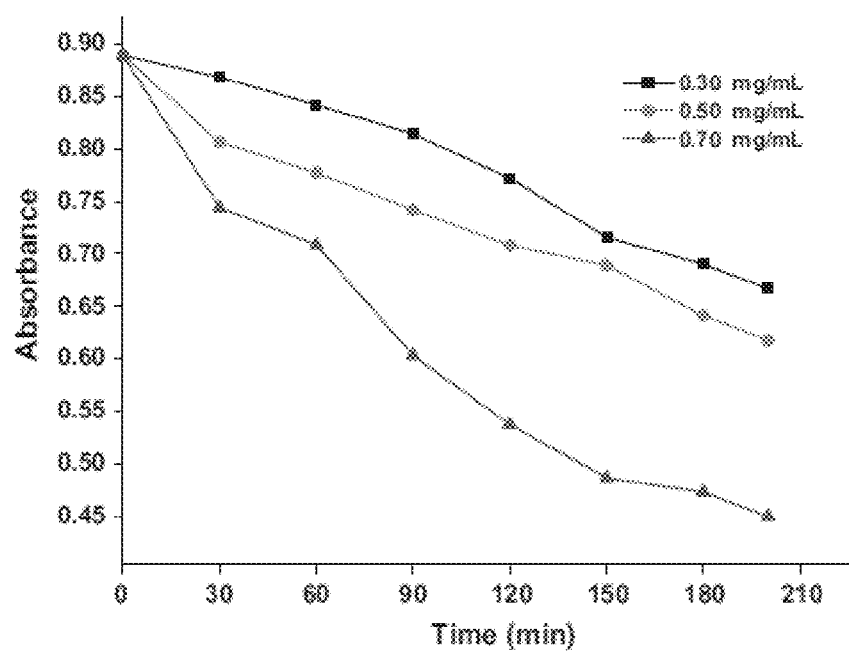
FIG. 9 is a graph of the time versus absorbance for photocatalytic degradation of drimarene red K-4BL dye at different dosages of catalyst (conditions: [dye]=30 ppm, [$H_2O_2$]=0.5 M. [catalyst]=0.30, 0.50, and 0.70 mg $mL^{-1}$)

A graph of absorbance verses time for 0.30, 0.50, and 0.70 mg mL$^{-1}$ dosage of catalyst is shown in FIG. 9. The plot describes that initially the degradation rate is too slow may be due to the sun rays irradiation but with the passage of time the rate of degradation increases and the value of absorbance decreases throughout the time interval. The time induction period decreases with increasing the amount of catalyst. In case of 0.30 and 0.50 mg mL$^{-1}$ catalyst dosage, quick decrease in value of absorbance can be seen but in case of higher amount of catalyst dosage at the same condition shows the best long term results undoubtedly, in starts there is no sharp decrease in absorbance but in minimum time it gives the quick results. After these final values in all three plots the value of absorbance does not decrease very much with time which indicate that catalysis has completed and shows that larger the amount of catalyst dosage at the same condition will be more productive. The value of apparent rate constant ($k_{app}$) is found to be 0.0015, 0.0017, and 0.0034 min$^{-1}$ for 0.30, 0.50, and 0.70 mg mL$^{-1}$ dosage of catalyst, respectively.

Effect of $H_2O_2$ Concentration

Figure 10:
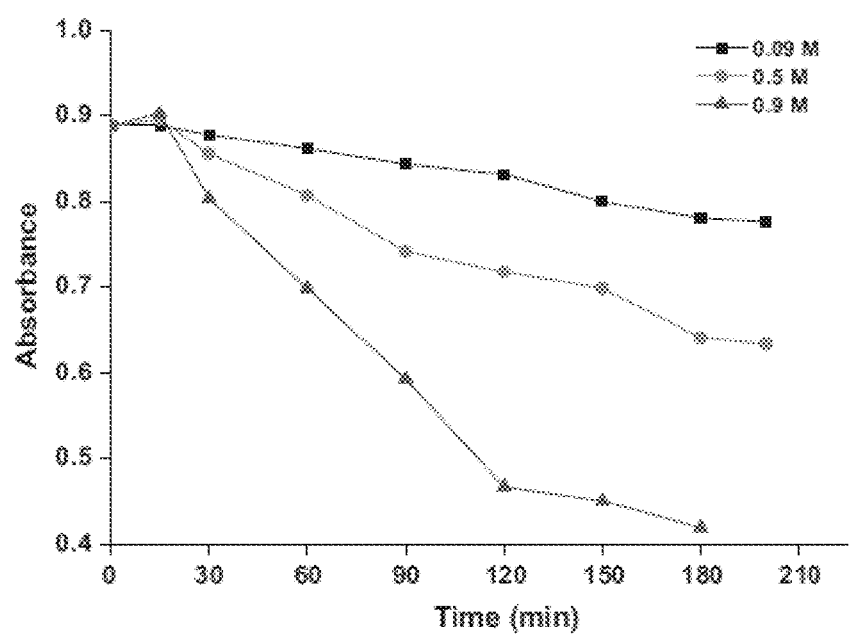
FIG. 10 is a graph of time versus absorbance for photocatalytic degradation of drimarene red K-4BL dye at different dosage of $H_2O_2$ (conditions: [dye]=30 ppm, [$H_2O_2$]=0.09, 0.5, and 0.9 M. [catalyst]=0.50 mg $mL^{-1}$)

A graph of absorbance versus time for 0.09, 0.5, and 0.9 M dosage of $H_2O_2$ is shown in FIG. 10. The plot shows that at the start, the degradation rate is high with a higher amount of $H_2O_2$ may be due to stirring effect but with the passage of time the rate of degradation increases and the value of absorbance decreases throughout the time interval. The time induction period decreases with increasing the amount of $H_2O_2$. In case of 0.09 M $H_2O_2$, value of absorbance is not decreased efficiently but in case of higher amount of 0.5 M of $H_2O_2$ at the same time shows a little sharp decrease in absorbance plot. The sharp and quick decrease in plot at the higher value of 0.9 M of $H_2O_2$ describes that by increasing the amount of $H_2O_2$ the process of dye degradation in the presence of sun irradiation increases significantly. The value of $k_{app}$ is found to be 0.0007, 0.0018, and 0.0047 min$^{-1}$ for 0.09, 0.5, and 0.9 M dosage of $H_2O_2$, respectively.

Example 5

$CoSn(OH)_6$ Nanoparticles as a Fuel Additive Catalyst

High octane petrol and diesel were used as a reference for checking the efficiency of fuel in the presence of synthesized nanoparticles as a catalyst because diesel fuel is mostly used in heavy engines. Efficiency of fuel was checked by investigating all parameters at different concentration in the presence of $CoSn(OH)_6$ nanoparticles. Flash point, pour point, fire point, cloud point, and calorific values were determined in order to check the combustion characteristics of diesel fuel. Specific gravity and kinematic viscosity were measured to analyze the physical features of diesel fuel.

Effect of $CoSn(OH)_6$ Nanoparticles on the Efficiency of Diesel Fuel

The effect of synthesized nanoparticles on the efficiency of diesel was studied by different parameters like flash point, fire point, specific gravity, and kinematic viscosity. These parameters were studied at different dosages of catalyst (0, 40, 60, 80, and 100 ppm). All the results obtained by using different dosages of catalyst are compared with reference of a blank sample.

Flash Point and Fire Point

Figure 11:
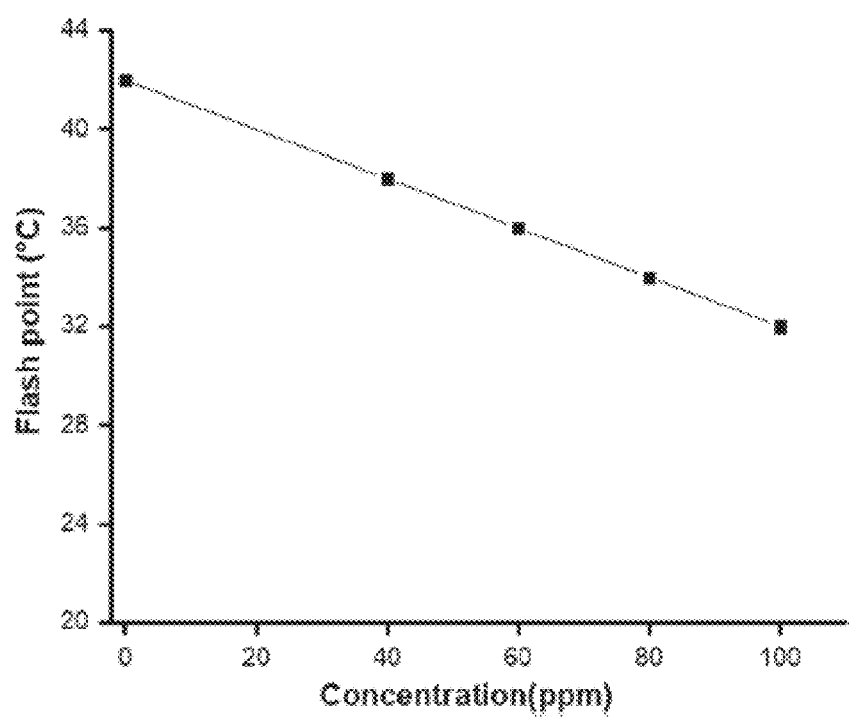
FIG. 11 is a graph illustrating the effect of $CoSn(OH)_6$ nanoparticles on the flash point of diesel fuel.
Figure 12:
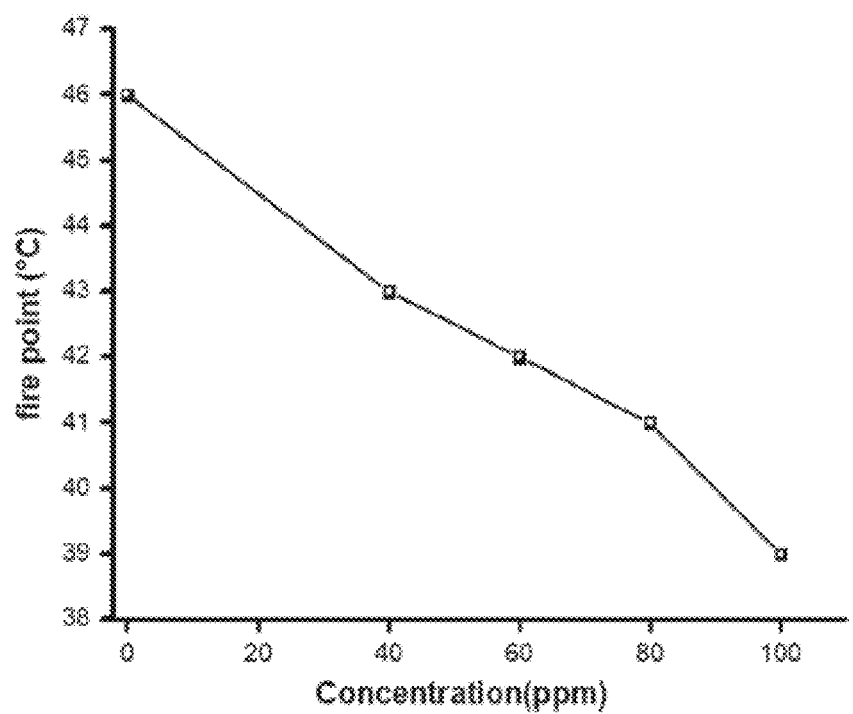
FIG. 12 is a graph illustrating the effect of $CoSn(OH)_6$ nanoparticles towards the fire point of diesel fuel.

The effect of flash and fire point on the efficiency of diesel oil at various concentrations of nanocatalyst (40, 60, 80, and 100 ppm) is shown in FIGS. 11 and 12, respectively. It is clear from the plots that in the absence of nanoparticles, flash and fire point values of diesel oil is high. But when catalyst is added in the solution, flash and fire point values decrease when increasing the concentration of nanocatalyst. Linear graph describes the continuous decrease in flash and fire point temperature. The decreasing behavior of flash and fire point describe that the newly synthesized nanoparticles are good for catalyst to increase the efficiency of fuel.

From the table value it can be seen that the numerical value of diesel in flash and fire point is too high in the absence of catalyst, but these values continuously decrease by increasing the concentration of $CoSn(OH)_6$ nanocubes in the solution. The temperature difference between flash and fire points of pure diesel is 4° C., and after adding catalyst it shifts to 6° C. and then ends with 7° C. This temperature difference indicates that the catalyst can play a vital role for increasing the efficiency of the diesel fuel by adjusting the dosage of the catalyst at analytical as well as for commercial scale.

Specific Gravity

Figure 13:
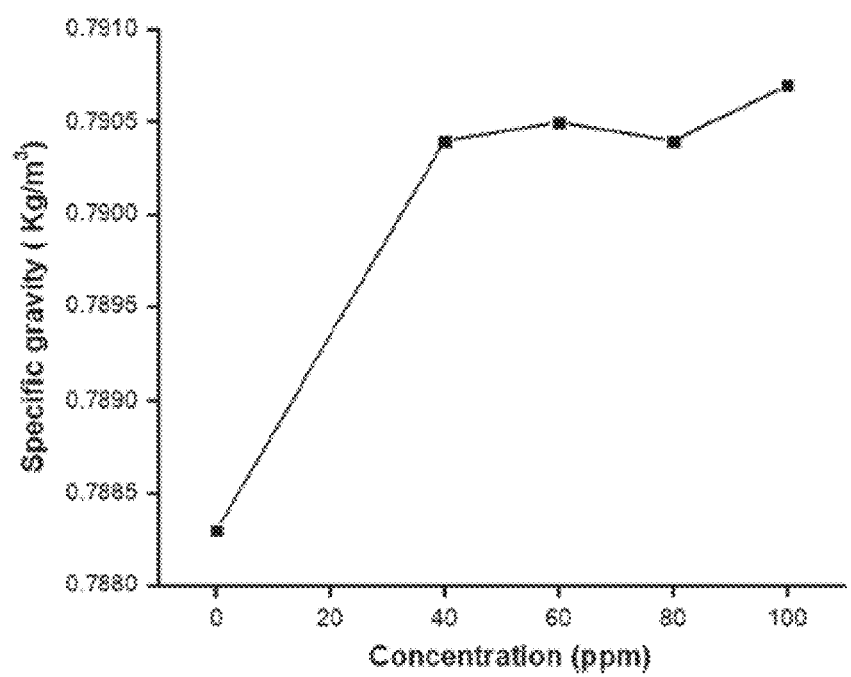
FIG. 13 is a graph illustrating the effect of $CoSn(OH)_6$ nanoparticles on the specific gravity of diesel fuel.

Specific gravity values of pure diesel are measured by the Specific gravity meter (DA640) at 25° C. with 10 s of pump time for each sample. $CoSn(OH)_6$ nano catalyst was used to observe the effect of specific gravity of diesel fuel and the results are shown in FIG. 13. First of all, specific gravity of pure diesel at 20° C. is measured which shows low values of specific gravity 0.7883 g/cm$^3$. When the nanocatalyst of 40 ppm concentration is added into the fuel it shows some strange behavior i.e. specific gravity of the diesel increase to 0.7904 g/cm$^3$ and continuously increasing by increasing the concentration of the catalyst except at 80 ppm value. Higher concentration of nanoparticles dosage (100 ppm) shows the high values of specific gravity. High specific gravity of diesel fuel is due to the high surface area of newly synthesized nanoparticles. The effect of the nanoparticles on specific gravity of fuel is shown in the graph in FIG. 13. By running the sample on three times the results show that the specific gravity value of pure diesel is low as compared to the modified diesel. At different concentrations the value fluctuates, but lower than the pure sample.

Cloud Point and Pour Point

The cloud point and pour point values of pure diesel are high as compared to the diesel containing different concentrations of nanoparticles. The value of cloud point is decreased by the addition of $CoSn(OH)_6$ nanoparticles initially. With high dosage of synthesized nanocubes, cloud point value of diesel fuel is initially decreased by 1° C. per 20 ppm and ends with 2° C. per 20 ppm approximately. And the pour point numeric values in the presence of different concentration of the catalyst in diesel are found to be in range of −33 to −35° C. Pour point values constantly decreased by 1° C. of each concentration with increasing the amount of $CoSn(OH)_6$ nanocubes up to 100 ppm. These numbers show that the pour point values are affected by the addition of synthesized catalyst dosage.

Calorimetric Values

In the presence of different dosage of concentration of $CoSn(OH)_6$ nanoparticles (40, 60, 80, and 100 ppm) calorific values of pure diesel are measured in Table 2. It can be seen from the table that pure diesel shows low calorific value. The diesel after adding catalyst at different concentration shows constantly high calorific values by increasing the concentration dosage of synthesized nanoparticles.

TABLE 2

Effect of various concentrations of $CoSn(OH)_6$ nanoparticles on the various parameters of modified diesel.

| Parameters | (Pure diesel) 0 ppm | Concentration of catalyst dosage | | | |
| --- | --- | --- | --- | --- | --- |
| | | 40 ppm | 60 ppm | 80 ppm | 100 ppm |
| Flash point | 42° C. | 38° C. | 36° C. | 34° C. | 32° C. |
| Fire point | 46° C. | 43° C. | 42° C. | 41° C. | 39° C. |
| Kinematic viscosity | 3.71 mm$^{-2}$s$^{-1}$ | 4.74 mm$^{-2}$s$^{-1}$ | 5.79 mm$^{-2}$s$^{-1}$ | 5.80 mm$^{-2}$s$^{-1}$ | 6.60 mm$^{-2}$s$^{-1}$ |
| Specific gravity | 0.7883 gcm$^{-3}$ | 0.7904 gcm$^{-3}$ | 0.7905 gcm$^{-3}$ | 0.7904 gcm$^{-3}$ | 0.7907 gcm$^{-3}$ |
| Cloud point | 9° C. | 7° C. | 6° C. | 4° C. | 2° C. |
| Pour point | −5° C. | −10° C. | −15° C. | −25° C. | −30° C. |
| Calorific values | 920 J g$^{-1}$ | 12.604 J g$^{-1}$ | 20.819 J g$^{-1}$ | 31.412 J g$^{-1}$ | 40.492 J g$^{-1}$ |

$CoSn(OH)_6$ nanoparticles are successfully prepared by hydrothermal approach. Morphological analysis shows that product is monodisperse and the size of nanoparticles lies in the nano range. The absorbance of drimarene K-4BL dye is found to be maximum at 520 nm wavelength. The degradation of drimarene K-4BL dye is studied to examine the photocatalytic properties of synthesized nanocubes. The value of apparent rate constant ($k_{app}$) is found to be 0.0015, 0.0017, and 0.0034 min$^{-1}$ for 0.30, 0.50, and 0.70 mg mL$^{-1}$ catalyst dosage, respectively. The value of $k_{app}$ is calculated to be 0.0007, 0.0018, and 0.0047 min$^{-1}$ for 0.09, 0.5, and 0.9 M concentration of $H_2O_2$, respectively. Comparative data analysis of all catalytic conditions shows that maximum degradation of drimarene K-4BL dye is observed for 0.9 M concentration of $H_2O_2$ and 0.50 mg mL$^{-1}$ catalyst dosage. Synthesized nanoparticles are also used as fuel additive to examine the efficiency of diesel fuel by studying different parameters. It is observed that the values of flash and fire point are significantly decreased while pour point and cloud point values and calorific values are increased by adding $CoSn(OH)_6$ nanoparticles. These Results which obtained from fuel additive properties and photocatalytic application have indicated that the newly synthesized $CoSn(OH)_6$ nanoparticles possess efficient surface area and photocatalytic properties.

As above, the development of a simple and sensitive approach with less runtime for the estimation of photodegradation of an anthraquinone dye drimarene red K-4BL in the presence of newly synthesized nano catalyst was described. Hydrothermal approach is used to synthesize cobalt hydroxystannate by using precursor salts of chloride i.e. stannic chloride, cobalt chloride and sodium hydroxide is used as a precipitating agent. Various techniques were used to analyze the product. Two major applications of synthesized nanocubes are investigating the efficiency of modified fuel and as a photocatalyst for dye degradation. Anthraquinone dye (drimarene red K-4BL) is degraded by the newly synthesized nanoparticles which is used as a catalyst in aqueous medium. In the presence of sun irradiation at different concentrations of hydrogen peroxide and catalyst, kinetics of photocatalytic degradation of dye is monitored on ultra violet visible spectrophotometer. Efficiency of modified fuel is analyzed by studying the various parameters such as flash point, fire point, pour point and cloud point, etc. at different dosage of Cobalt hydroxystannate. By changing the dosage of the catalyst, values of these parameters changed significantly.

The invention claimed is:

1. A method of enhancing the efficiency of a liquid fuel, comprising:
   mixing cobalt hydroxystannate nanoparticles with the liquid fuel to produce an enhanced liquid fuel having a calorific value that is greater than the calorific value of the liquid fuel.

2. The method of claim 1, wherein the cobalt hydroxystannate nanoparticles consist essentially of cobalt hydroxystannate having the formula $CoSn(OH)_6$.

3. The method of claim 1, wherein the cobalt hydroxystannate is in the form of nanocubes having an average edge length in a range of 40-400 nm.

4. The method of claim 1, wherein the cobalt hydroxystannate is in a cubic crystal form having a unit cell dimension in a range of 7.0 to 8.5 Å.

5. The method of claim 4, wherein the cobalt hydroxystannate is in the space group P n-3 m.

6. The method of claim 1, wherein the cobalt hydroxystannate nanoparticles are present in the enhanced liquid fuel with a concentration in a range of 50-200 ppm.

7. The method of claim 1, wherein a calorific value of the enhanced liquid fuel is between 25 and 52 times the calorific value of the liquid fuel.

8. The method of claim 1, wherein the liquid fuel and the enhanced liquid fuel have specific gravities having a percent difference of 0.5% or less.

9. The method of claim 1, wherein a kinematic viscosity of the enhanced liquid fuel is 50-85% greater than a kinematic viscosity of the liquid fuel.

10. The method of claim 1, wherein the liquid fuel is at least one selected from the group consisting of kerosene fuel, diesel fuel, gasoline fuel, biodiesel fuel, alcohol fuel, and synthetic fuel.

11. The method of claim 10, wherein the liquid fuel is a diesel fuel.

12. The method of claim 11, wherein the enhanced liquid fuel has a flash point of 35° C. or lower.

13. The method of claim 11, wherein the enhanced liquid fuel has a fire point of 43° C. or lower.

14. The method of claim 11, wherein the enhanced liquid fuel has a cloud point of 7° C. or lower.

15. The method of claim 11, wherein the enhanced liquid fuel has a pour point of −10° C. or lower.

16. The method of claim 11, wherein the enhanced liquid fuel has a calorific value in a range of 20-50 kJ/g.

17. The method of claim 11, wherein the enhanced liquid fuel has a kinematic viscosity in a range of 5.75-7.00 mm$^{-2}$·s$^{-1}$.

18. The method of claim 11, wherein the enhanced liquid fuel has a cetane number of 50 or greater.

19. The method of claim 11, wherein the enhanced liquid fuel has a specific gravity in a range of 0.7900-0.7950 g/cm$^3$.

20. The method of claim 1, wherein the cobalt hydroxystannate nanoparticles are part of a composition.

\* \* \* \* \*